United States Patent
Larkin et al.

(10) Patent No.: US 7,444,032 B2
(45) Date of Patent: Oct. 28, 2008

(54) DEMODULATION AND PHASE ESTIMATION OF TWO-DIMENSIONAL PATTERNS

(75) Inventors: Kieran Gerard Larkin, Putney (AU); Michael Alexander Oldfield, Eastwood (AU); Donald James Bone, Kaleen (AU)

(73) Assignee: Canon Kabushiki Kaisha, Tokyo (JP)

( * ) Notice: Subject to any disclaimer, the term of this patent is extended or adjusted under 35 U.S.C. 154(b) by 500 days.

(21) Appl. No.: 11/334,510

(22) Filed: Jan. 19, 2006

(65) Prior Publication Data

US 2006/0120621 A1 Jun. 8, 2006

Related U.S. Application Data

(62) Division of application No. 09/754,310, filed on Jan. 5, 2001, now Pat. No. 7,043,082.

(30) Foreign Application Priority Data

| Jan. 6, 2000 | (AU) | ................................ PQ4964 |
| Apr. 14, 2000 | (AU) | ................................ PQ6913 |
| Aug. 3, 2000 | (AU) | ................................ PQ9157 |

(51) Int. Cl.
  G06K 9/36 (2006.01)
  G06K 9/46 (2006.01)
(52) U.S. Cl. ................ 382/248; 382/280; 348/638; 358/469
(58) Field of Classification Search ................ 382/210, 382/248, 280; 375/316–352; 455/295–340; 348/638–641; 358/469
See application file for complete search history.

(56) References Cited

U.S. PATENT DOCUMENTS

| 5,247,351 | A  | * | 9/1993  | Cho .......................... 348/487 |
| 5,459,323 | A  | * | 10/1995 | Morgan .................... 250/458.1 |
| 6,285,474 | B1 | * | 9/2001  | Kawano et al. ............... 359/29 |
| 6,516,184 | B1 | * | 2/2003  | Damgaard et al. ............ 455/86 |
| 6,560,449 | B1 | * | 5/2003  | Liu ............................ 455/302 |
| 6,614,914 | B1 |   | 9/2003  | Rhoads et al. .............. 382/100 |
| 7,184,737 | B2 | * | 2/2007  | Liu ............................ 455/302 |
| 7,239,354 | B2 | * | 7/2007  | Moritani ..................... 348/445 |
| 2003/0181187 | A1 | * | 9/2003 | Liu ............................ 455/302 |
| 2004/0008276 | A1 | * | 1/2004 | Moritani .................... 348/445 |
| 2008/0126460 | A1 | * | 5/2008 | Jiang et al. .................. 708/317 |

OTHER PUBLICATIONS

"A Multidimensional Energy Operator For Image Processing," P. Maragos et al., SPIE Conference on Visual Communications and Image Processing, Boston, MA (1992), pp. 177-186.

"The Structure of Efficient Demodulators for Multidimensional Phase Modulated Signals," H.L. Van Trees, IEEE Transactions on Communications, Sep. 1963, pp. 261-271.

* cited by examiner

Primary Examiner—Aaron W Carter
(74) Attorney, Agent, or Firm—Fitzpatrick, Cella, Harper & Scinto

(57) ABSTRACT

A method (100) of demodulating a real two-dimensional pattern (110) is disclosed. The method (100) estimates (120, 130) a quadrature two-dimensional pattern from the real two-dimensional pattern (110) using a smooth phase only transform having an anti-symmetric phase, such as a spiral phase filter (140). A demodulated image is created by combining (180) the real two-dimensional pattern (110) and the estimated quadrature two-dimensional pattern.

17 Claims, 21 Drawing Sheets

Fig. 8
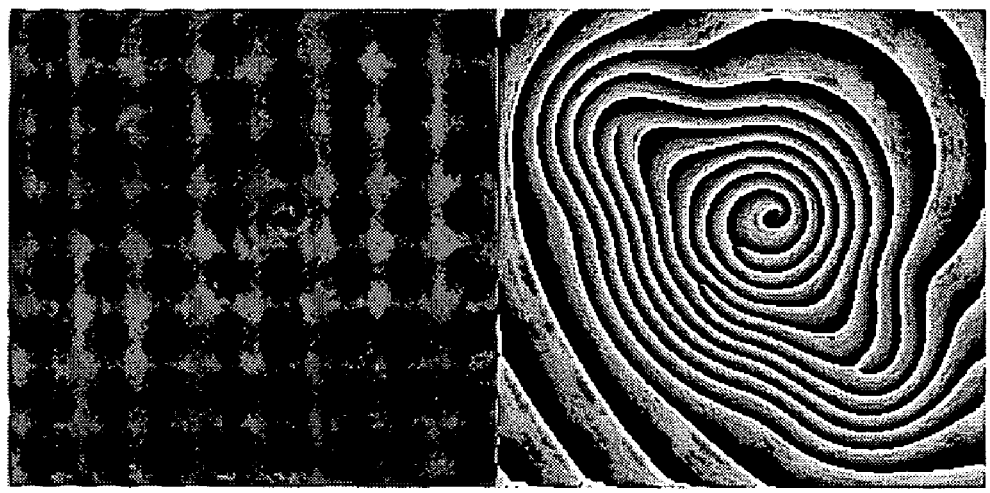
Fig. 9A          Fig. 9B

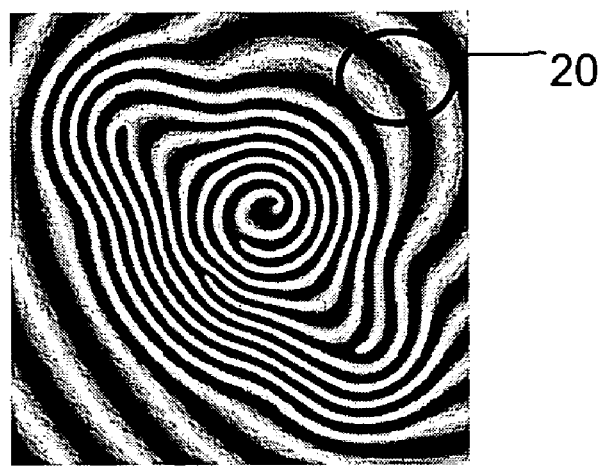
Fig. 12A
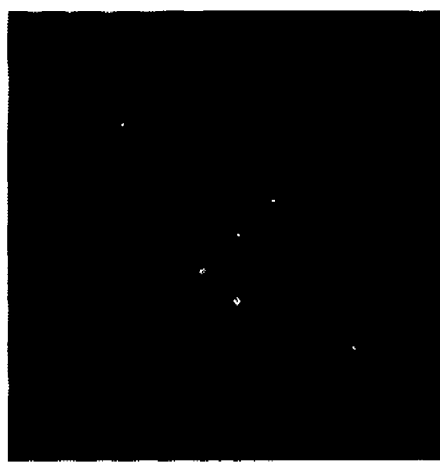
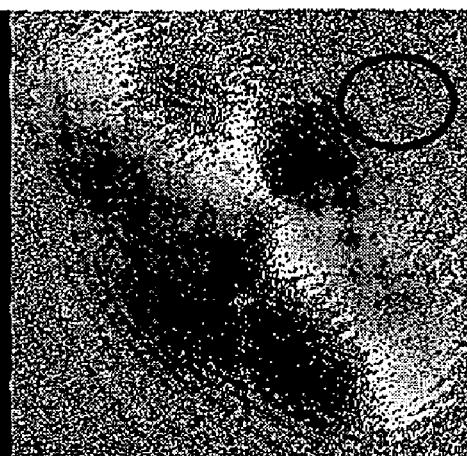
Fig. 12B     Fig. 12C
Fig. 12D     Fig. 12E

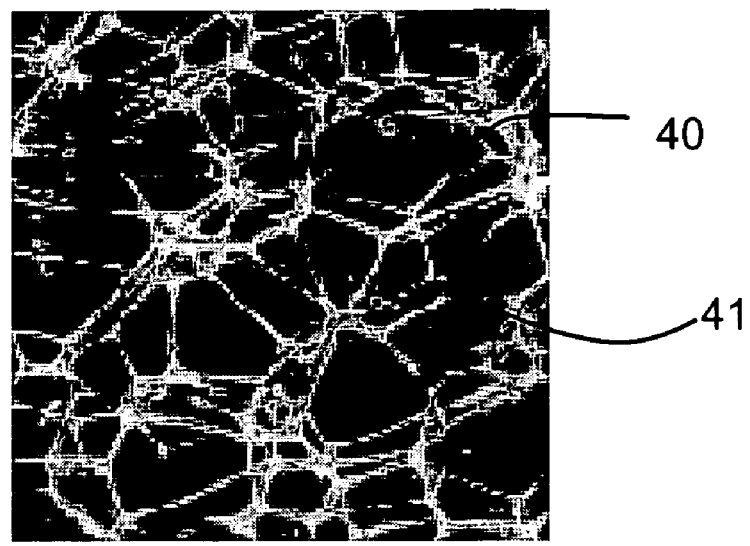
Fig. 15A
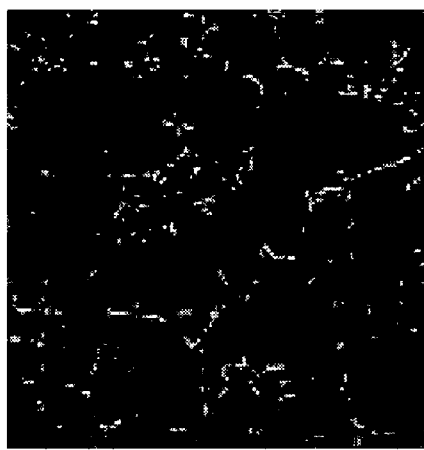
Fig. 15B    Fig. 15C
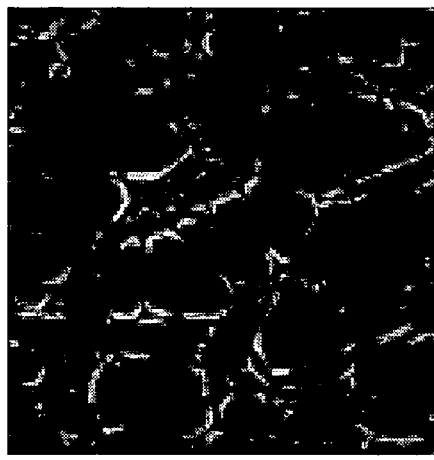
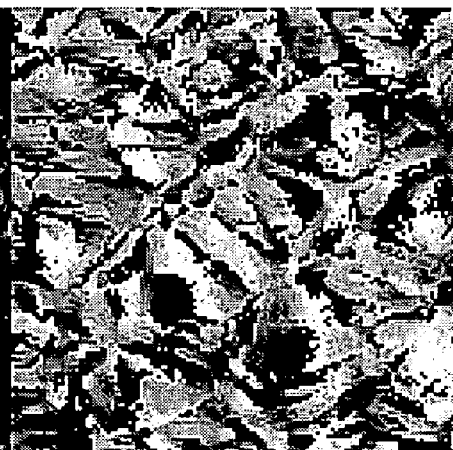
Fig. 15D    Fig. 15E.

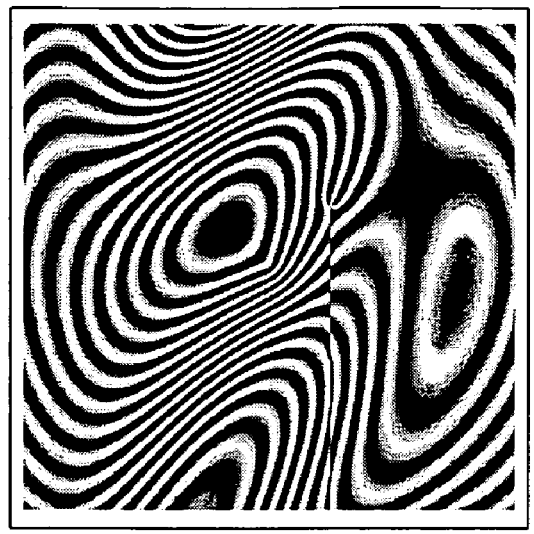
Fig. 20
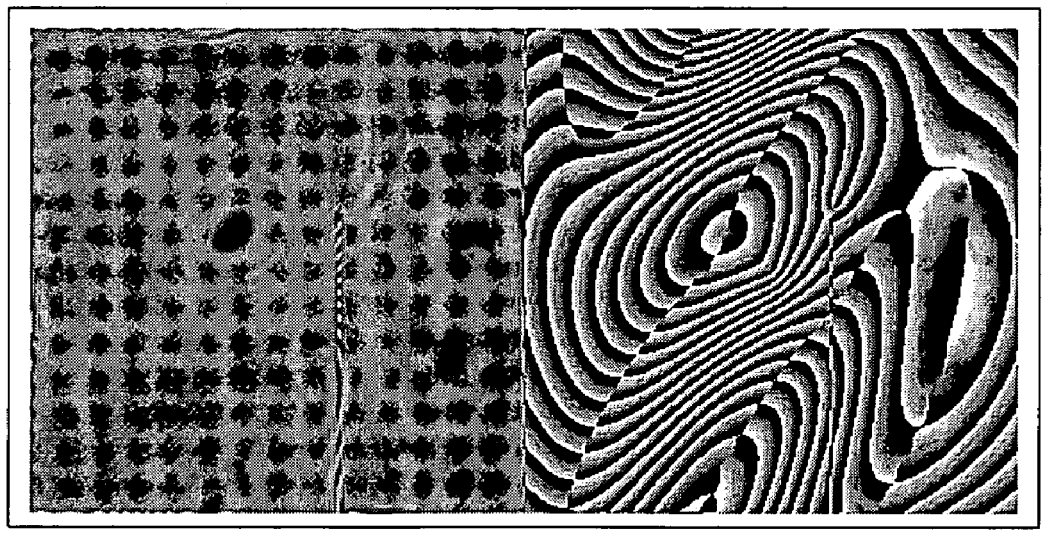
Fig. 21A  Fig. 21B

Fig. 24
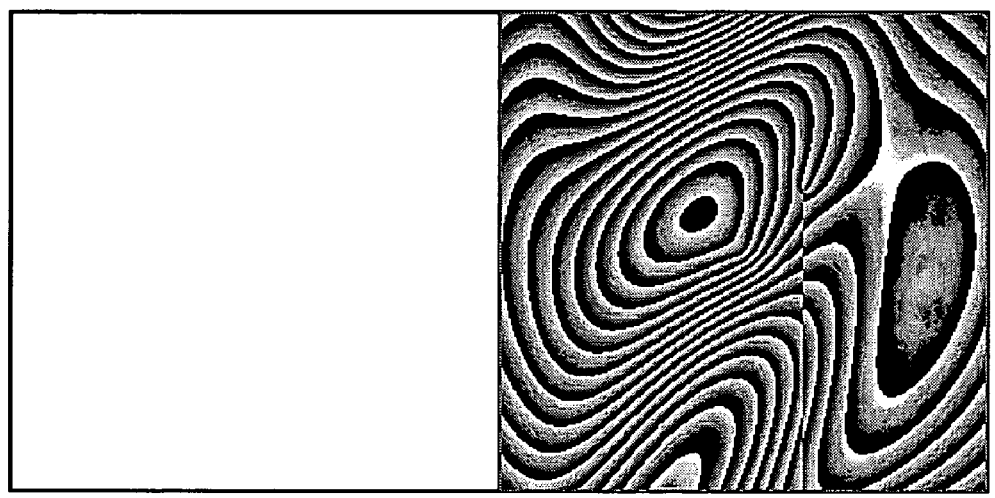
b(x,y)        χ(x,y)
Fig. 25A        Fig. 25B

DEMODULATION AND PHASE ESTIMATION OF TWO-DIMENSIONAL PATTERNS

CROSS REFERENCE TO RELATED APPLICATION

This application is a division of U.S. application Ser. No. 09/754,310, filed on Jan. 5, 2001, the entire disclosure of which is incorporated by reference herein.

FIELD OF THE INVENTION

The present invention relates to two-dimensional code patterns and more particularly to the automatic demodulation of fringe patterns. The present invention also relates to the automatic estimation of pattern and texture orientation of an image. The present invention further relates to phase demodulation of a sequence of fringe patterns with arbitrary and unknown phase shifts between them. Such patterns typically occur in optical interferograms, but can also occur in interferograms produced by more general waves such as acoustic, synthetic aperture radar (SAR), ultrasound, and x-ray. More general image sequences, such as video, can in some cases also be modelled as fringe pattern sequences.

BACKGROUND

Methods exist for demodulating fringe patterns. Examples of such patterns are illustrated in FIGS. 5 and 14A. However, conventional methods of demodulating closed curve fringe patterns, including circular and elliptical fringe patterns, inevitably produce ambiguities. Ambiguities are then typically resolved by including additional constraints. These additional constraints may include restrictions on the smoothness of curves within the fringe patterns.

In addition to ambiguities other defects and errors may also be produced by the preliminary demodulation process. An example of this can be found in the classic Fourier (Hilbert) transform method (FTM). When the FTM is applied to a whole image, artefacts are produced, the artefacts being related to discontinuities introduced by the half-plane filter used in Fourier space. The artefacts result in errors in phase estimation, and specifically in regions where an angle of the fringe pattern is close to perpendicular with the half-plane discontinuity line.

A method adopted to overcome this problem is to choose the half-plane filter in Fourier space such that the discontinuity line does not cut through the signal in Fourier space.

However, the frequency components derived from circular or elliptical fringe patterns are also "circular" and no discontinuity line could be defined which does not cut through the frequency signal.

Other methods based on local (small kernel) demodulation may avoid the errors of the FTM, but typically fail to disambiguate correctly when there are strong perturbations in the underlying fringe pattern. Features such as bifurcations and fringe endings represent typically strong perturbations.

Images are often characterised by a number of features including pattern and texture. A number of image processing operations depend upon the estimation of the orientation of these image features.

Image processing/analysis applications where the estimation of orientation is important include:

edge orientation detection;

orientation input to steerable filters;

pattern analysis;

texture analysis, where the local orientation of texture is estimated for characterisation purposes; and orientation selective filtering, processing, and enhancement of images.

One such area where the estimation of orientation is particularly important is the demodulation of fringe patterns or equivalently, AM-FM modulated patterns. One area where such patterns exist is in fingerprint analysis. Other areas include the analysis of naturally formed patterns such as an iris diaphragm, ripples in sand, and fluid convection in thin layers. The primary reason why it is useful to know the fringe orientation when demodulating such a fringe pattern is because it allows for 1-dimensional demodulators to be aligned correctly.

Another area where the estimation of pattern orientation is used is in image re-sampling and enhancement.

Known methods for estimating pattern orientation include gradient-based methods. A serious deficiency with such gradient-based methods is that at the ridges and valleys of images, the gradient has zero magnitude. Gradient methods are therefore unable to provide information about pattern direction in such regions.

Interferometry refers to experiments involving the interference of two light waves that have suffered refraction, diffraction or reflection in the interferometer. Such experiments typically involve the testing of lenses, mirrors and other optical components. The principle parameter of interest in interferometry is the phase difference between interfering beams.

Present methods of demodulating sequences of phase-related fringe-patterns generally rely on a priori knowledge of the phase-shifts between each of the individual patterns. When these relative phase-shifts are available, it is possible to estimate the spatial phase by using a generalised phase-shifting algorithm (PSA). In cases where the relative phase-shifts are not a priori known, the estimated spatial phase will be incorrect unless special error-reducing PSAs are used or methods to estimate the actual phase-shift between patterns are used.

Error-reducing PSAs are useful where the deviation of the actual phase-shift from the expected phase-shift is small (typically less than 0.1 radian) and deterministic. When the phase-shift deviation is larger and/or non-deterministic (ie essentially random), then other methods must be used.

Methods have been developed to estimate phase shifts between phase-related fringe patterns. Certain of the methods, based on statistical (least squares) estimation, requires at least 5 fringe patterns to work. Methods based on fitting the phase shifts to an ellipse also require at least 5 fringe patterns. Methods based on the statistical properties of spatial phase histograms have been proposed, but are heavily dependent on certain restrictive, and often unrealistic criteria. More recently methods based upon the correlation between patterns have been proposed but are very sensitive to the number of full fringes in the frames. These correlation methods assume that the fringes are essentially linear in the frame, which means only trivial fringe patterns can be processed. Methods based on the maximum and minimum variation of individual pixels in different patterns typically require at least 15 frames to operate effectively.

Accordingly, current methods of demodulating sequences of phase-related fringe-patterns are unsatisfactory in many situations, especially for a small number of phase-related fringe-patterns, and many algorithms do not work in the case of three or four frames.

DISCLOSURE OF THE INVENTION

It is an object of the present invention to substantially overcome, or at least ameliorate, one or more disadvantages of existing arrangements.

According to a first aspect of the invention, there is provided a method of demodulating a real two-dimensional pattern, the method comprising the steps of:

estimating a quadrature two-dimensional pattern from said real two-dimensional pattern using a smooth phase only transform having an anti-symmetric phase; and creating a demodulated image by combining said real two-dimensional pattern and said estimated quadrature two-dimensional pattern.

According to another aspect of the invention, there is provided an apparatus for demodulating a real two-dimensional pattern, the apparatus comprising:

means for estimating a quadrature two-dimensional pattern from said real two-dimensional pattern using a smooth phase only transform having an anti-symmetric phase; and means for creating a demodulated image by combining said real two-dimensional pattern and said estimated quadrature two-dimensional pattern.

According to yet another aspect of the invention, there is provided an apparatus for calculating a quadrature conjugate of a real two-dimensional code pattern, the apparatus comprising:

a first spatial light modulator for modulating coherent light to produce said real two-dimensional pattern;

a first lens for Fourier transformation of said real two-dimensional pattern to produce a first Fourier transformed image;

a second spatial light modulator or spiral phase plate for phase modulating said first Fourier transformed image to produce a phase modulated image;

a second lens for Fourier transformation of said phase modulated image to produce a second Fourier transformed image;

a third spatial light modulator or spiral phase plate for phase modulating said second Fourier transformed image to produce said conjugate of said real two-dimensional pattern; and an image sensor for capturing said conjugate of said real two-dimensional pattern.

Other aspects of the invention are also disclosed.

BRIEF DESCRIPTION OF THE DRAWINGS

A number of embodiments of the present invention will now be described with reference to the drawings and appendix, in which:

FIG. 8 is an alternative estimate of fringe orientation of the fringe pattern image of FIG. 5;

FIGS. 9A and 9B are the magnitude and phase components of a demodulated fringe pattern when the estimate of fringe orientation of the fringe pattern image as shown in FIG. 8 is used;

FIG. 12A is an example of a fringe pattern image containing noise;

FIGS. 12B and 12C are the magnitude and phase components respectively of applying the energy operator to the image of FIG. 12A;

FIGS. 12D and 12E are the magnitude and phase components respectively of applying a modified energy operator to the image of FIG. 12A;

FIG. 15A is an example of a texture image;

FIGS. 15B and 15C are the magnitude and phase components respectively of applying the energy operator to the image of FIG. 15A;

FIGS. 15D and 15E are the magnitude and phase components respectively of applying the modified energy operator to the image of FIG. 15A;

FIG. 20 shows yet another an example of a fringe pattern;

FIGS. 21A and 21B show the magnitude and phase components respectively of an analytic image of the example fringe pattern shown in FIG. 20;

FIG. 24 shows a polarity function calculated from the phase difference shown in FIG. 22A and the modulus of the phase difference shown in FIG. 23A;

FIGS. 25A and 25B show estimations of an amplitude modulation and a phase of the fringe pattern shown in FIG. 20;

DETAILED DESCRIPTION INCLUDING BEST MODE

Consider a two-dimensional fringe pattern with intensity of the fringe pattern as follows:

$$f(x,y)=a(x,y)+b(x,y)\cdot\cos[2\pi(u_0\{x-x_o\}+v_0\{y-y_0\})+\chi] \quad (1)$$

Position coordinates (x, y) may be continuous for an analog pattern or discrete for digital patterns. A background level is denoted by $a(x,y)$ while an amplitude modulation term is denoted by $b(x,y)$, both assumed to be slowly varying functions. Phase term $\chi(x_0,y_0)$ presents the local offset of the overall phase term in the square brackets [ ] of Equation (1).

Figure 1:
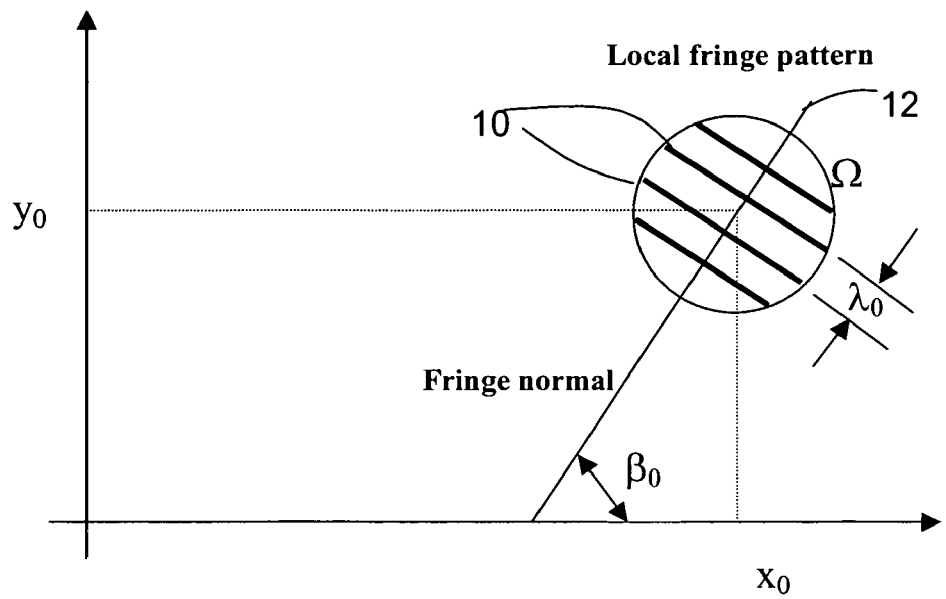
FIG. 1 is an illustration of the local structure of a fringe pattern.

Referring to FIG. 1 where a 2-dimensional fringe pattern or AM-FM pattern, located around a point $(x_0,y_0)$ and formed by a number of fringes 10 is shown. A small region of interest is defined by $\Omega$. Within this small region $\Omega$, the spatial frequency components $u_0$ and $v_0$ are slowly varying so that they are effectively constant around the point $(x_0,y_0)$, making the carrier a linear function of x and y. A normal 12 to the local fringes 10 is at an angle $\beta_0$ to the x-axis.

A noise term is omitted from Equation (1), but may be present in real fringe patterns due to the occurrence of blurring, non-linearities, quantisation errors, smudging, scratches, cuts, dust, etc.

The intensity pattern $f(x, y)$ is (generally) a rapidly varying function of position coordinates (x, y).

The Fourier transform (FT) of the above fringe pattern region $\Omega$ is:

$$F_\Omega(u, v) = \int_\Omega \int f(x, y)\exp[-2\pi i(ux + vy)]dxdy \quad (2)$$
$$= A_\Omega(u, v) + (B_\Omega(u - u_0, v - v_0)\exp[i\chi] +$$
$$B_\Omega(u + u_0, v + v_0)\exp[-i\chi])e^{-2\pi i(ux_0+vy_0)}$$

wherein $i=\sqrt{-1}$

Figure 2:
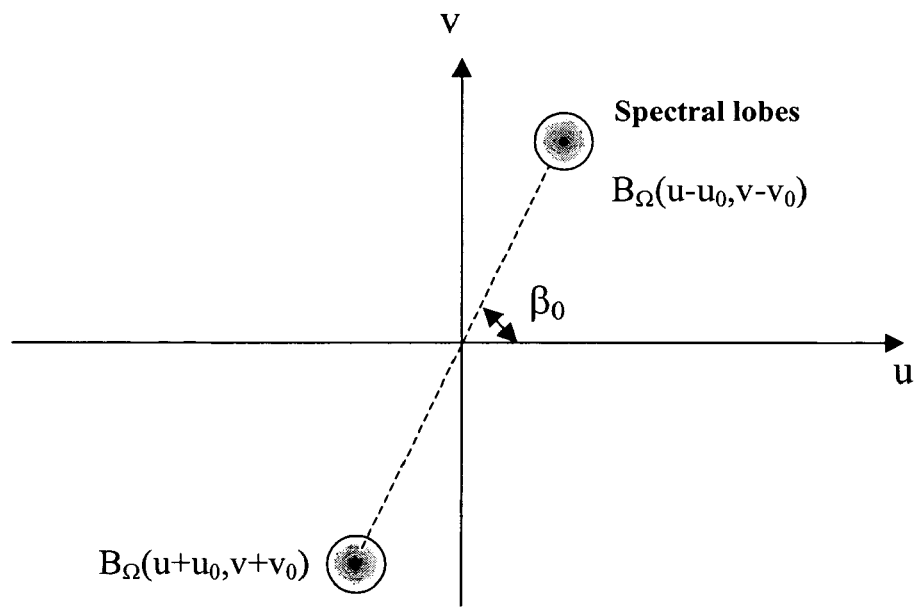
FIG. 2 is an illustration of the Fourier transform of the local fringe pattern of FIG. 1.

From Equation (2) it is clear that the Fourier transform $F_\Omega$ of the fringe pattern f has 3 lobe centres, the first being at the origin and another two at spectral coordinates $(u_0,v_0)$ and $(-u_0,-v_0)$. The last two lobe centres are mirror images of each other with regards to the origin. The effect of windowing the fringe pattern f over a small region $\Omega$ is to blur the otherwise sharp lobes. The central lobe $A_\Omega$, representing the zero frequency component, can be removed, and will therefore be disregarded in the following analysis. Methods that may be used for removal of the zero frequency components include using a suitably matched high pass filter. The remaining spectral lobes are illustrated in FIG. 2.

The local spatial frequency components $u_0$ and $v_0$ of the fringe pattern f satisfies the following Equations:

$$\left.\begin{array}{l}u_0^2 + v_0^2 = \sigma_0^2 \\ \sigma_0 = \dfrac{2\pi}{\lambda_0} \\ \tan(\beta_0) = \dfrac{v_0}{u_0}\end{array}\right\} \quad (3)$$

wherein $\beta_0$ is an angle of the normal to the fringes with the x-axis and $\lambda_0$ is the spacing between fringes.

The conventional Fourier transform method (FTM) of fringe analysis is based on the assumption that the angle $\beta_0$ is confined to a small range for the entire fringe pattern, typically much less than $\pi$ radians. However, when considering fringe patterns with circular, elliptical carrier patterns or other closed curves, the angle $\beta_0$ covers the entire angle range from 0 to $2\pi$ radians. The FTM would therefore be deficient in solving fringe patterns created with closed curve carriers. The reason for this failure is related to the inability of the FTM to isolate the two (mirrored) lobes of the FT. As noted above, the frequency components derived from closed curve fringe patterns are also "closed curves". Therefore, referring again to Equation (2), both the second and third terms will have "closed curve" spectral components, causing a total lobe overlap.

The preferred implementation removes directional discontinuities in the Fourier processing of the fringe pattern f by smoothly encoding the fringe direction by utilizing a filter with odd (180° rotational) symmetry, but (unlike the FTM) a smooth transition between adjacent frequencies. Also, the filter used in the preferred implementation does not alter the strength of different frequency components, and is therefore a unit magnitude or phase only filter.

A (complex) Fourier representation $P(u,v)$ of the filter preferably has the following anti-symmetry qualities:

$$P(u,v)=\exp[iX(u,v)]=-P(-u,-v)=-\exp[i(X(u,v)+\pi)] \quad (4)$$

A preferred filter chosen has a phase $X(u,v)$ which is set equal to the polar angle $\phi$:

$$X(u,v)=\phi \quad (5)$$

where $$\left.\begin{array}{l}u = q\cos(\phi) \\ v = q\sin(\phi) \\ u^2 + v^2 = q^2\end{array}\right\} \quad (6)$$

The resulting filter is termed a "spiral phase filter" because the filter phase X increases linearly as the polar angle $\phi$ increases. The magnitude of the filter is constant (so the filter is a pure phase filter) and the phase has the form of a spiral or helical surface with just one turn. An equivalent form of the filter is simply:

$$P(u, v) = \dfrac{(u + iv)}{q} = e^{i\phi} \quad (7)$$

The Fourier transform of the fringe pattern after the central lobe has been removed is as follows:

$$G_\Omega(u,v) = (B_\Omega(u-u_0, v-v_0)\exp[i\chi] + B_\Omega(u+u_0, v+v_0)\exp[-i\chi])e^{-2\pi i(ux_0+vy_0)} \quad (8)$$

Applying the spiral phase filter $P(u,v)$ to Equation (8) changes the lobe symmetry to give:

$$\hat{G}(u,v) = P(u,v).F'_\Omega(u,v) = (B_\Omega(u-u_0, v-v_0)\exp[i\chi]\exp[i\phi] - B_\Omega(u+u_0, v+v_0)\exp[-i\chi]\exp[i\phi])e^{-2\pi i(ux_0+vy_0)} \quad (9)$$

Equation (9) can be inverse transformed, as is shown in Equation (10), by implicitly assuming that the polar angle $\phi(u,v) \approx \pm\beta_0$ remains constant over each lobe. This is equivalent to assuming that the lobe subtends a small polar angle $\phi$, which is a reasonable assumption for typical fringe patterns f.

$$\hat{g}(x,y) = \int_{-\infty}^{\infty}\int_{-\infty}^{\infty} \hat{G}(u,v)\exp[2\pi i(ux+vy)]dudv \quad (10)$$
$$= i\exp[i\beta_0] \cdot b \cdot \sin[2\pi(u_0\{x-x_0\} + v_0\{y-y_0\}) + \chi]$$

The desired sine component of the local fringe pattern $\hat{g}(x,y)$ can then be extracted by multiplying $\hat{g}(x,y)$ with an orientational phase component, $\exp[-i\beta_0]$ as follows:

$$\hat{g}(x,y).\exp[-i\beta_0] = i.b.\sin[2\pi(u_0\{x-x_0\}+v_0\{y-y_0\})+\chi] \quad (11)$$

Conceptually the process is repeated for all fringe regions with their corresponding fringe orientation angles $\beta$. In practice the procedure can be applied to all regions simultaneously. It is noted that the original (conceptual) windowing is not actually required.

The aforementioned process depends upon the functions $b(x,y)$, $\beta(x,y)$, $\chi(x,y)$, $u_0(x,y)$, $v_0(x,y)$, and $\sigma_0(x,y)$ having suitably slow variation. However, it is found in practice that the preferred implementation can be successfully implemented on any fringe pattern f with a suitably smooth variation in orientation $\beta(x,y)$ and spacing $\lambda_0$. For fringe patterns f with circular fringes and constant or quadratic (chirp) fringe spacing $\lambda_0$, the preferred implementation only breaks down near the very center of the fringe pattern f due to the assumption of small polar angle subtense failing near the centre.

Equation (11) represents an estimation of the imaginary part of the analytic function (or image) related to the original real fringe pattern f. This component is also called the quadrature component or analytic conjugate. By forming a new (complex) output image comprising the original real image f and the estimated imaginary image, the phase and magnitude of the resulting complex fringe representation can be obtained as follows:

$$(f-a)+(\hat{g}(x,y)\exp\{-i\beta_0\}) \approx b.\exp\{i[2\pi i(u_0\{x-x_0\}+v_o\{y-y_0\})+\chi]\} \quad (12)$$

Figure 3:
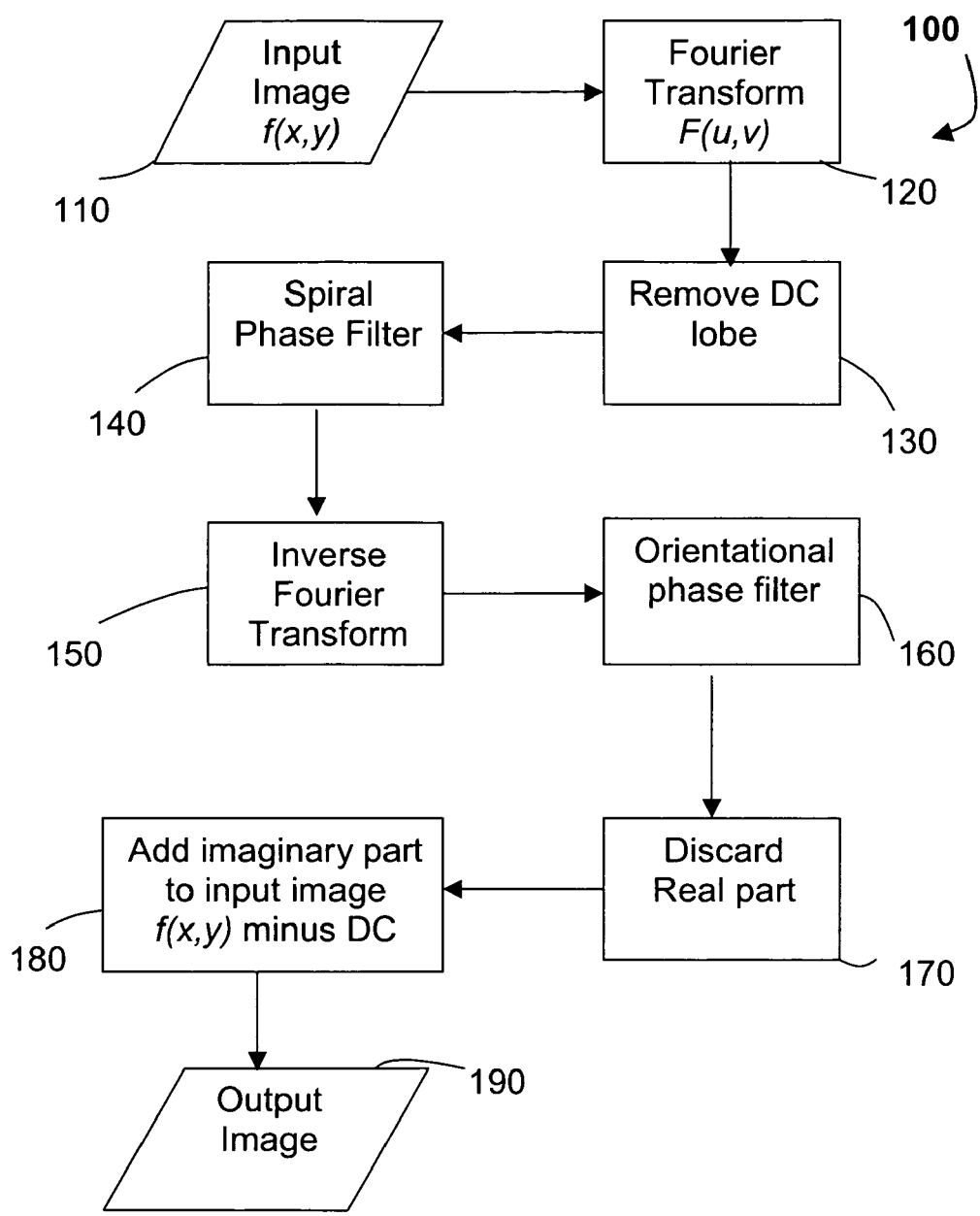
FIG. 3 is a flow diagram of a method of phase demodulation.

FIG. 3 is a flow diagram of a phase demodulation process 100. The fringe pattern image f(x,y), captured in step 110, typically includes only a real part. The fringe pattern image f(x,y) is transformed in step 120 by applying a 2-dimensional FFT. Because the fringe pattern image f(x,y) is real, the real and imaginary parts of the transform F(u,v) are symmetric and antisymmetric respectively.

The DC component (lobe) of the transform F(u,v) is removed in step 130. In step 140, a smooth phase only transform having an anti-symmetric phase is applied to the output from step 130. Preferably the spiral phase filter P(u,v) is used as the transform. Equivalently the Riesz transform may be applied in step 140.

In step 150, the inverse Fourier transform is calculated. This may be performed by again applying a 2-dimensional FFT.

In step 160, an orientational phase filter is applied to the resulting image of step 150. In step 170 the real part is discarded, leaving only the imaginary part, which is then added to the input fringe pattern image f(x,y) in step 180 to produce an output image in step 190.

Figure 4:
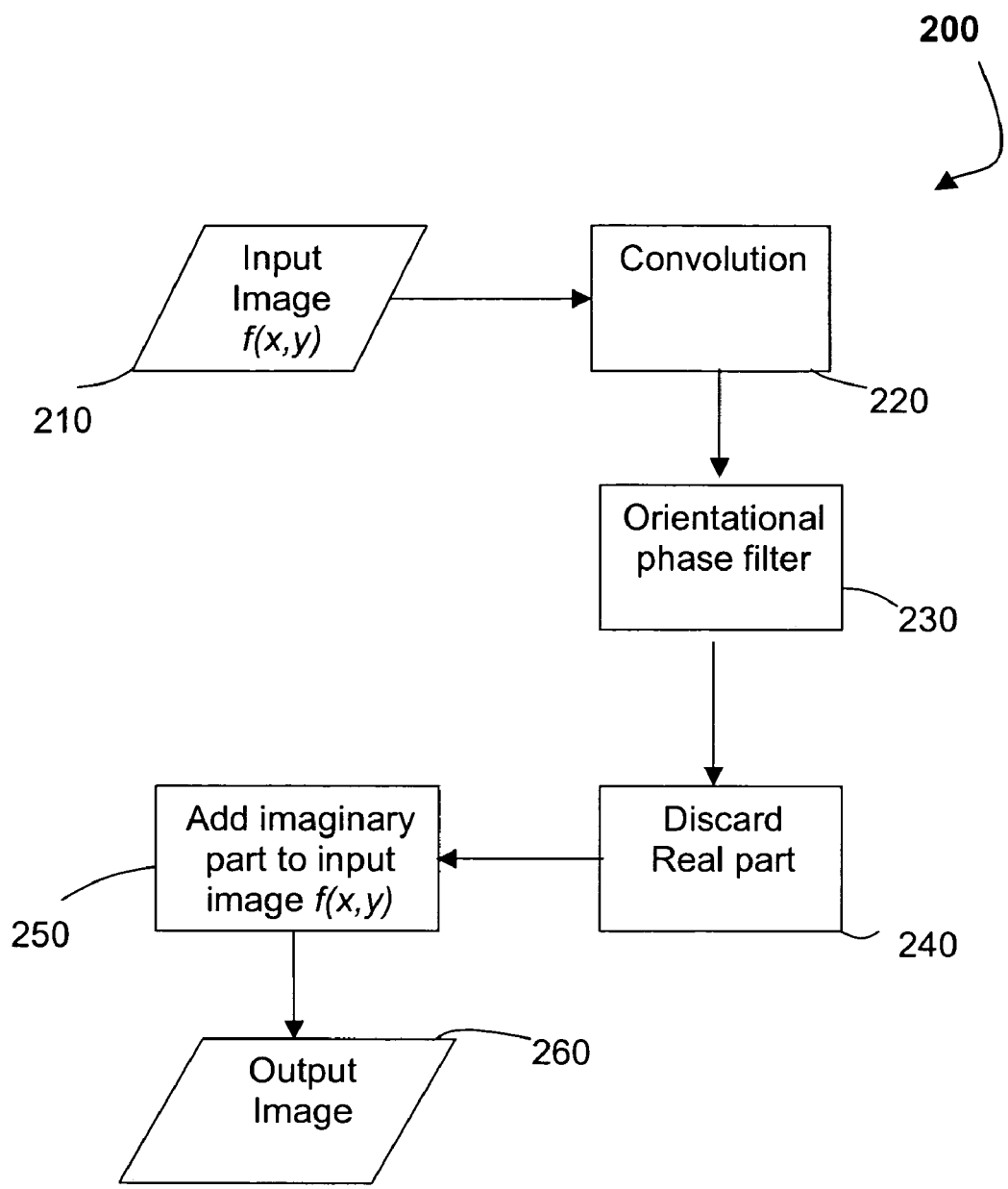
FIG. 4 is a flow diagram of an alternative method of phase demodulation.
Figure 5:
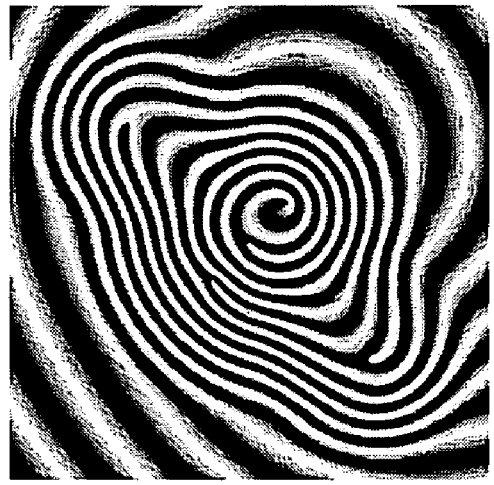
FIG. 5 is an example of a fringe pattern image.

FIG. 4 is a flow diagram of an alternative implementation of a phase demodulation process 200, and will be explained with reference to an example fringe pattern. An example of such a two-dimensional fringe pattern is illustrated in FIG. 5, wherein only the real part of the pattern is known.

The fringe pattern image f(x,y) is captured in step 210. In the phase demodulation process 200, steps 120 to 150 of the phase demodulation process 100 shown in FIG. 3 are replaced by a single convolution step 220. The fringe pattern image f(x,y) is preferably convolved with spiral phase function p(x,y), wherein p(x,y) is defined as follows:

$$p(x,y) = \int_{-\infty}^{\infty}\int_{-\infty}^{\infty} P(u,v)\exp[2\pi i(ux+vy)]dudv \quad (13)$$
$$= \int_{-\infty}^{\infty}\int_{-\infty}^{\infty} \frac{(u+iv)}{\sqrt{u^2+v^2}}\exp[2\pi i(ux+vy)]dudv$$

$$p(x,y) = \frac{i(x+iy)}{2\pi r^3} = \frac{i}{2\pi r^2}\exp(i\theta) \quad (14)$$

wherein $$\left.\begin{array}{l} x = r\cos\theta \\ y = r\sin\theta \end{array}\right\} \quad (15)$$

Figures 6, 7:
FIGS. 6 and 7 are the real and imaginary parts of an intermediate result in applying the method of FIG. 4 to the image of FIG. 5.

The result after such a convolution on the fringe pattern image f(x,y) of FIG. 5 is illustrated in FIGS. 6 and 7, showing the real and imaginary parts of f(x,y)*p(x,y).

Referring again to FIG. 4, in step 230 the orientational phase filter, $\exp[-i\beta]$ is applied. However, an estimation of the fringe orientation $\beta$ is needed.

One method of estimating the fringe orientation $\beta$ is to compute the 2-D energy operator which gives uniform estimates over the fringe pattern image f(x,y). In contrast, typical gradient based methods fail to give reliable orientation estimates at the peaks and valleys of the fringes.

An alternative method of estimating the fringe orientation $\beta$ is to use an uniform orientation estimator, but to utilise local environmental constraints (such as topology of smoothly varying fringes) to resolve or unravel the orientational ambiguity. FIG. 8 illustrates a smooth estimate of the fringe orientation $\exp(i\beta)$ derived from $\exp(2i\beta)$. The orientation phase estimate $\exp(i\beta)$ has only one discontinuity line at positions where the phase changes from 360° to 0°. A number of different methods are suitable for resolving the orientational ambiguity. The magnitude and phase components of the result of step 230 using the estimation of the fringe orientation $\beta$ of FIG. 8 is illustrated in FIGS. 9A and 9B.

It is noted that an estimate of the orientation can be obtained from the output of step 150 in FIG. 3 or alternatively from the output of step 220 in FIG. 4. However, additional unravelling will be required to obtain a useable orientation estimate.

A preferred implementation of estimating the fringe orientation $\beta$ is described in detail below.

In step 240 the real part is discarded, leaving only the imaginary part, which is then added to the input fringe pattern image f(x,y), in step 250 to produce an output image in step 260.

Figure 10:
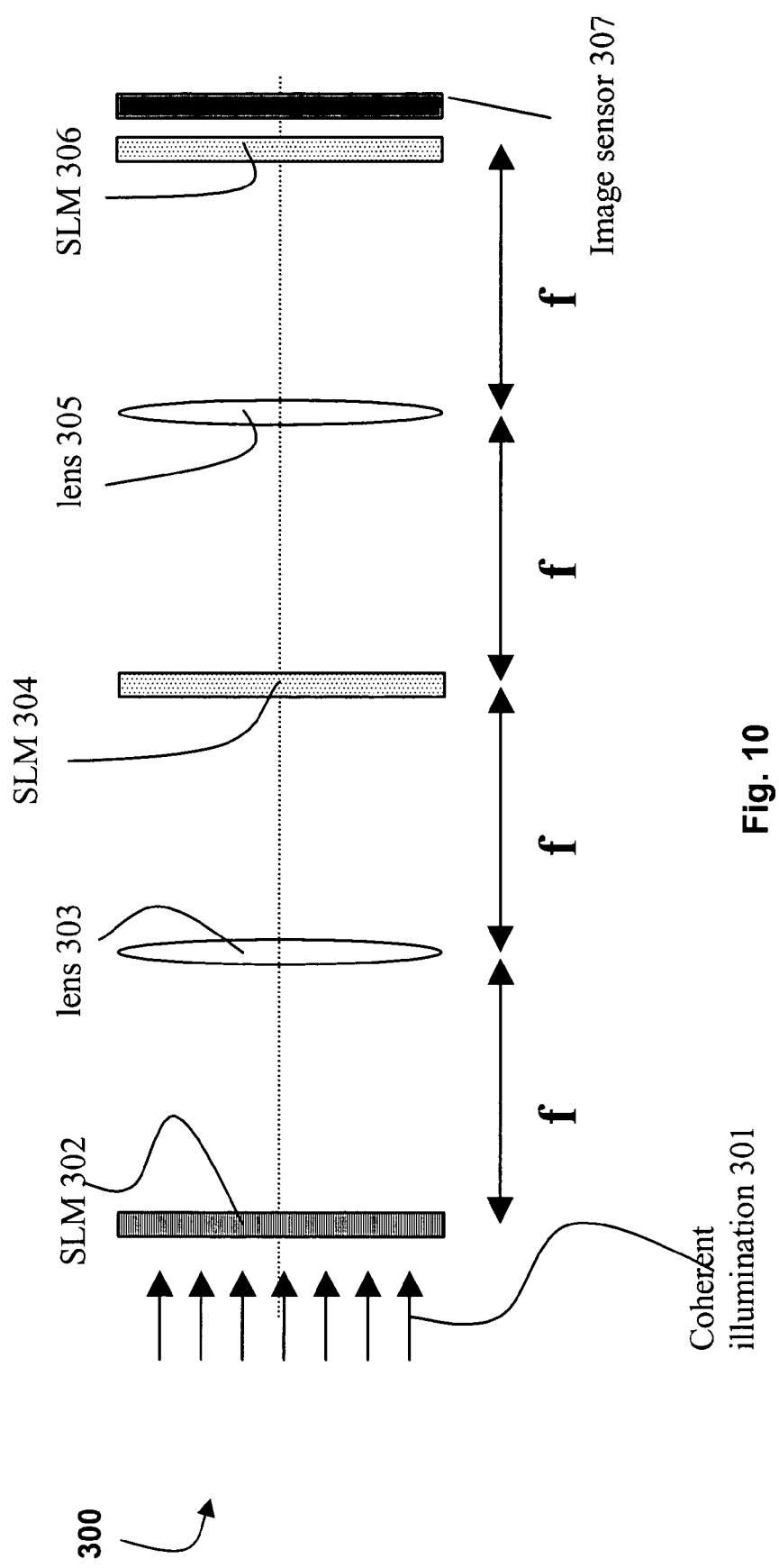
FIG. 10 is a schematic block diagram of an optical spiral phase demodulator.

The method of FIG. 3 can be practiced using an optical spiral phase demodulator 300, such as that shown in FIG. 10. The optical spiral phase demodulator 300 is illuminated by coherent light 301. A first spatial light modulator (SLM) 302 modulates the coherent light 301 to produce the input image, which is typically a fringe pattern f(x,y). The fringe pattern f(x,y) is Fourier transformed by lens 303. A second SLM 304 or a spiral phase plate performs phase modulation in the image projected on it. The phase modulated image is then Fourier transformed by lens 305 and is projected onto a final SLM 306 or spiral phase plate. The final spiral phase plate 306 retards the coherent optical beam in a manner such that the plate introduces a spiral phase multiplication. An image sensor 307 is in close proximity to the final SLM 306 to detect an output image. The output image will be in quadrature (or analytic conjugate) to the input image. In other words, if a cosine pattern is input, a sine pattern is output.

In the special case where the input image is a circularly symmetric fringe pattern, then the SLM 306 has the simple form of a spiral phase with opposite sign to SLM 304.

Returning to the description of the estimation of the fringe orientation β, it is noted that in recent years, an efficient method of signal demodulation using a concept known as an "energy operator" has become popular. The operator can be used for demodulation of AM and FM signals, including combined AM-FM signals, using a result from the analysis of simple harmonic motion (SHM). The energy operator $\Psi$ is defined as:

$$\Psi\{g(x)\} = \left(\frac{\partial g}{\partial x}\right)^2 - g\frac{\partial^2 g}{\partial x^2} \tag{16}$$

A particularly useful property of the energy operator $\Psi$ is that it gives uniform estimates of modulation parameters anywhere on the signal f. Essentially this is due to the fact that, at local peaks (and troughs) of the signal f, the energy is concentrated in the potential energy component, represented by the second term in Equation (16), whereas at the zero crossings, the energy is in the kinetic component represented by the first term in Equation (16). In other words, the rapidly varying sine and cosine components associated with AM-FM signals are exactly cancelled out by the energy operator $\Psi$, leaving an underlying constant representing total energy.

The operation of the energy operator $\Psi$ has also been extended to N-dimensions. This is described in the publication "A multi-dimensional energy operator for image processing", SPIE Conference on Visual Communications and Image Processing, Boston, Mass., [1992], 177-186, by P. Maragos, A. C. Bovik, and J. F. Quartieri.

Utilising the energy operator $\Psi$ on images, (i.e. data sets formed in 2-dimensions,) separate x and y components may be calculated and added together to obtain an overall 2-dimensional energy operator.

However, the energy operator $\Psi$ defined in this simple way has certain deficiencies. The main deficiency being that the orientation associated with the energy components is strictly limited to the positive quadrant of the x-y plane, which means that visually very different orientations are indistinguishable using two positive energy components.

Referring again to FIG. 1 and Equation (1), the intensity of the fringe pattern can be represented as follows:

$$g(x,y) = b(x,y) \cdot \cos[2\pi(u_0\{x-x_0\} + v_0\{y-y_0\}) + \chi] \tag{17}$$

wherein any slowly varying (non-multiplicative) background offsets a(x,y) are removed with an appropriate high-pass filter. The local spatial frequency components $u_0$ and $v_0$ satisfy Equations (3).

The x and y component energy operators $\Psi_x$ and $\Psi_y$ respectively may be performed on the fringe pattern defined in Equation (17) as follows:

$$\Psi_x\{g(x)\} = \left(\frac{\partial g}{\partial x}\right)^2 - g\frac{\partial^2 g}{\partial x^2} \approx (2\pi u_0 b)^2 \tag{18}$$

$$\Psi_y\{g(x)\} = \left(\frac{\partial g}{\partial y}\right)^2 - g\frac{\partial^2 g}{\partial y^2} \approx (2\pi v_0 b)^2 \tag{19}$$

Substituting Equations (18) and (19) into Equations (3), the local frequency and orientation of the local fringe pattern may alternatively be expressed as follows:

$$\sigma_0^2 = \frac{\Psi_x\{g\} + \Psi_y\{g\}}{(2\pi b)^2} \tag{20}$$

$$\tan(\beta_0) = \pm\sqrt{\frac{\Psi_y\{g\}}{\Psi_x\{g\}}} \tag{21}$$

Equation (21) indicates a loss in sign information, which corresponds to an inability to distinguish between fringes at four different orientations $\beta_0$, $-\beta_0$, $\pi+\beta_0$, $\pi-\beta_0$. This is very undesirable because the human eye can clearly separate orientation $\beta_0$ from $\pi-\beta_0$, and $-\beta_0$ from $\pi+\beta_0$. In general, however, it is not possible to distinguish (on a local level at least) between any orientation and the $\pi$ rotated orientation.

An alternative approach to extending the energy operator $\Psi$ to two dimensions is by defining a two dimensional complex operator $\Psi_c$ which encodes the energy in the magnitude and the orientation in the phase:

$$\Psi_x\{g\} + \Psi_y\{g\} = (2\pi b)^2(u_0^2 + iv_0^2) \tag{22}$$

As mentioned above, the simple x and y components alone fail to represent the orientation correctly. A preferable approach would be to have a 2D energy operator that has the following output:

$$\Psi_c\{g(x)\} = (2\pi b)^2(u_0 + iv_0)^2 = (2\pi\sigma_0 b)^2 \exp(2i\beta_0) \tag{23}$$

The complex energy operator $\Psi_c$ enables the isolation of the fringe spacing $\lambda_0$, as seen in FIG. 1, and orientation angle $\beta_0$ respectively. It is noted that the term 2 in the exponential factor of Equation (23) again causes the orientation angle $\beta_0$ to be defined modulo $\pi$. Such an energy operator is developed by defining a 2-dimensional complex differential operator D as follows:

$$D\{g\} = \frac{\partial g}{\partial x} + i\frac{\partial g}{\partial y} \tag{24}$$

The complex energy operator $\Psi_c$ can then be defined as follows:

$$(D\{g\})^2 - gD^2\{g\} = (2\pi\sigma_0 b)^2 \exp(2i\beta_0) = \Psi_c\{g\} \tag{25}$$

With the Fourier transform defined as follows:

$$G(u, v) = \int_{-\infty}^{\infty}\int_{-\infty}^{\infty} g(x, y)\exp[-2\pi i(ux + vy)]dx\,dy \tag{26}$$

the operator D can be implemented in the Fourier space, providing the following relationship:

$$(2\pi i)(u+iv)G(u,v) = \int_{-\infty}^{\infty}\int_{-\infty}^{\infty} D\{g(x,y)\}\exp[-2\pi i(ux+vy)]dx\,dy \quad (27)$$

wherein $$2\pi(u+iv) = 2\pi q.\exp(i\phi) \quad (28)$$

and the polar coordinate transforms are:

$$\left.\begin{array}{l} u = q\cos(\varphi) \\ v = q\sin(\varphi) \\ u^2 + v^2 = q^2 \end{array}\right\} \quad (29)$$

The corresponding Fourier operation of Equation (27) provides for the multiplication of the Fourier transform of the fringe pattern G(u,v) with a spiral phase filter, q exp(iφ). The spiral phase filter has the characteristic of linearly (conical) increasing in magnitude with frequency. The Fourier transformation pairs may be written as:

$$G(u,v) \Leftrightarrow g(x,y) \quad (30)$$

$$(2\pi i)q\exp(i\phi)G(u,v) \Leftrightarrow D\{g(x,y)\} \quad (31)$$

$$(2\pi i)^2 q^2 \exp(2i\phi)G(u,v) \Leftrightarrow D^2\{g(x,y)\} \quad (32)$$

The derivatives in Equation (25) can therefore be implemented as 2-dimensional Fourier filters with spiral phase and conical magnitude.

Figures 11A, 11B:
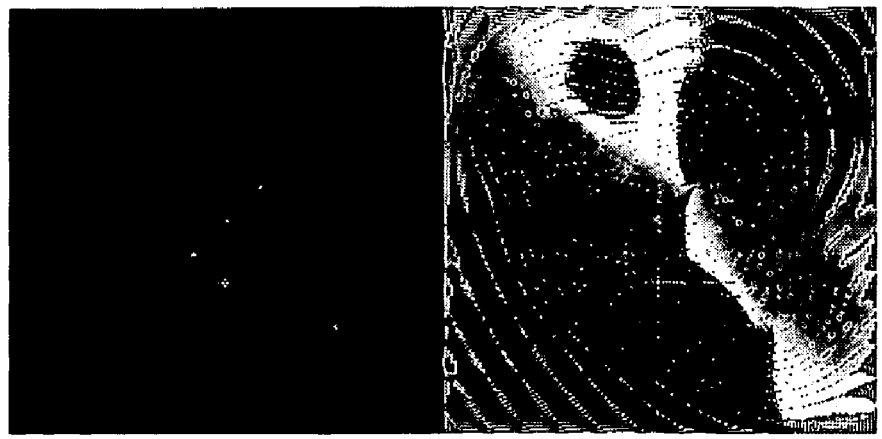
FIGS. 11A and 11B are the magnitude and phase components respectively of an intermediate result in applying an energy operator to the image of FIG. 5.
Figures 11C, 11D:
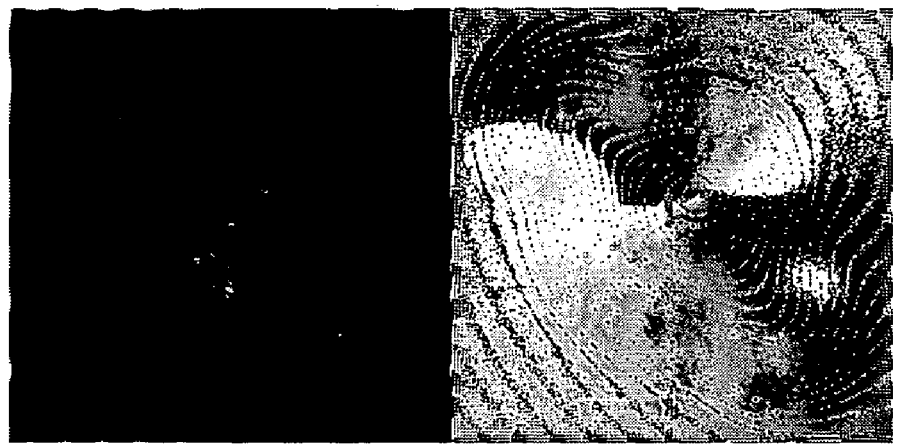
FIGS. 11C and 11D are the magnitude and phase components respectively of another intermediate result in applying the energy operator to the image of FIG. 5.
Figures 11E, 11F:
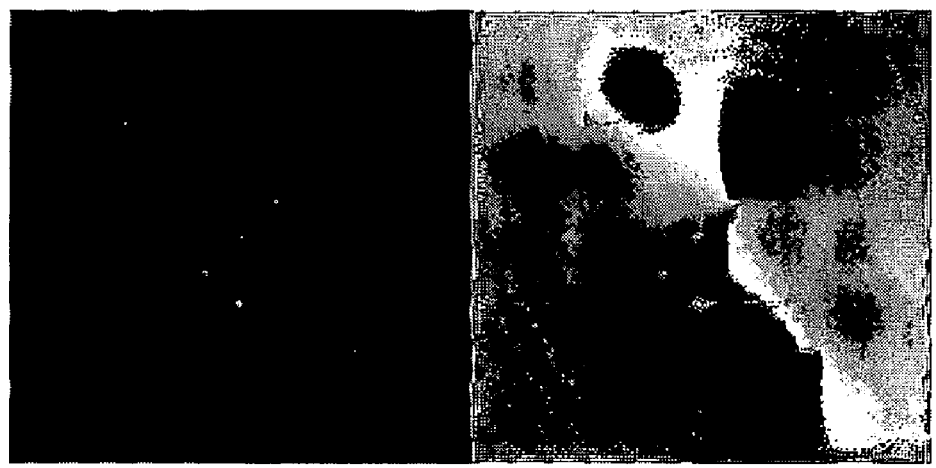
FIGS. 11E and 11F are the magnitude and phase components respectively of applying the energy operator to the image of FIG. 5.

By applying the differential operators defined in Equations (30) to (32) as filters through simple multiplication of the image of FIG. 5, the results as shown in FIGS. 11A to 11F is obtained. FIGS. 11A and 11B show the magnitude and phase components respectively of the $(D\{g\})^2$ term of Equation (25), calculated by using the relationship in Equation (31). Similarly, FIGS. 11C and 11D show the magnitude and phase components respectively of the $gD^2\{g\}$ term of Equation (25), calculated by using the relationship in Equation (32). The magnitude and phase components respectively of the complex energy operator $\Psi_c$ is shown in FIGS. 11E and 11F. Referring to Equation (23), the phase component of the complex energy operator $\Psi_c$ has double the orientation angle $\beta_0$ of the fringe pattern f.

All the above calculations and derivations may alternatively be implemented as convolution operators without Fourier transformation.

However, when the energy operator $\Psi_c$ is applied to a fringe pattern f containing noise, such as that shown in FIG. 12A, the resulting magnitude and phase components of the complex energy operator $\Psi_c$, shown in FIGS. 12B and 12C, are less satisfactory. The primary reason for the degradation is the linear (conical) spectral enhancement of the differential operator D. The differential operator D effectively enhances high frequency noise, as it essentially operates as a high-pass filter. In particular, in the areas of low spatial frequency $\sigma_0$, such as the area 20 on FIG. 12A, the contribution by the noise signal due to the differentiation dominates the determination of the orientation of the fringe pattern. Referring to FIG. 12C, the phase component, from which the orientation can be obtained by using the relationship from Equation (23), provides near random noise in the corresponding area 22.

One possible correction is to apply a low pass filter function to the input image or the result. However, the energy operator $\Psi$ is not a linear (shift invariant) operator. It is dependent on products of the input function g and its derivatives $\partial g/\partial x$ and $\partial^2 g/\partial x^2$, as can be seen from Equation (16). Low pass filtering results in the image becoming blurred.

To overcome the deficiencies of the complex energy operator $\Psi_c$, while maintaining the ease of calculation of the orientation angle $\beta_0$, a pure phase operator $D_M$, thus having uniform (spectral) magnitude, is created by setting q in Equations (31) and (35) to unity, to define the following Fourier transform pair:

$$\exp(i\phi)G \Leftrightarrow D_M\{g(x,y)\} \quad (33)$$

The pure phase operator $D_M$ is a spiral phase (or vortex) operator which results in the removal of noise without significant blurring of the signal. By applying the modified energy operator $\Psi_M$ defined as:

$$\Psi_M\{g\} = (D_M\{g\}) - gD_M^2\{g\} \quad (34)$$

to the image in FIG. 12A, the magnitude and phase components respectively of the modified energy operator $\Psi_M$ shown in FIGS. 12D and 12E, are obtained. The comparison of the phase components of the complex energy operator $\Psi_c$ shown in FIG. 12C and modified energy operator $\Psi_M$ shown in FIG. 12E, and in particular to the corresponding areas 22 and 24 respectively, indicate that the modified energy operator $\Psi_M$ provides a better result.

It is noted that, similar to the energy operator $\Psi$, the modified energy operator $\Psi_M$ is also non-linear. A consequence of this is that it is generally not possible to obtain the performance of the modified energy operator $\Psi_M$ by merely applying a low pass filter to the input function, nor by filtering the output function, of the energy operator $\Psi$.

The modified energy operator $\Psi_M$ has a property of scale invariance, which it inherits from the scale invariant $D_M$ operator. Scale invariance is another aspect of the operator's spectral neutrality and means that the operator essentially gives outputs independent of feature size.

Figure 13A:
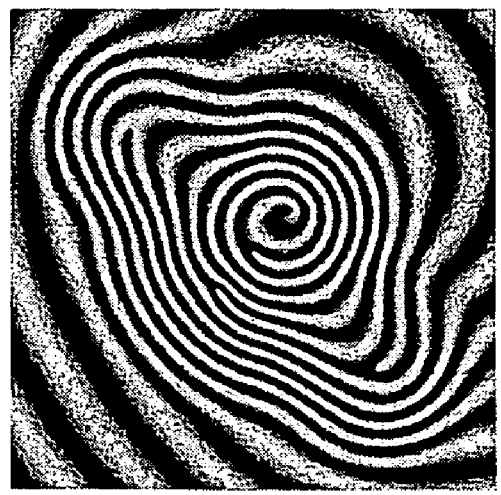
FIG. 13A is another example of a fringe pattern image containing noise.
Figure 13B:
FIGS. 13B and 13C are the magnitude and phase components respectively of applying the energy operator to the image of FIG. 13A.
Figure 13C:
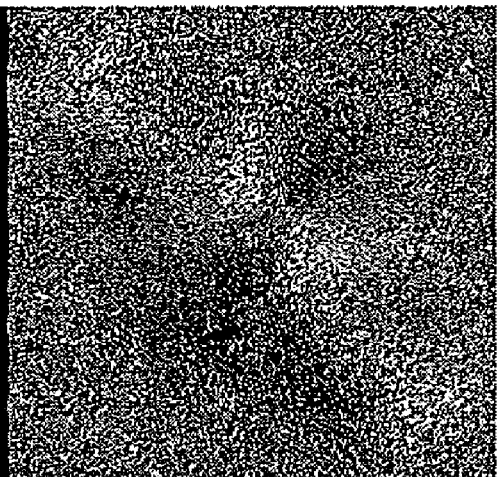
Figures 13D, 13E:
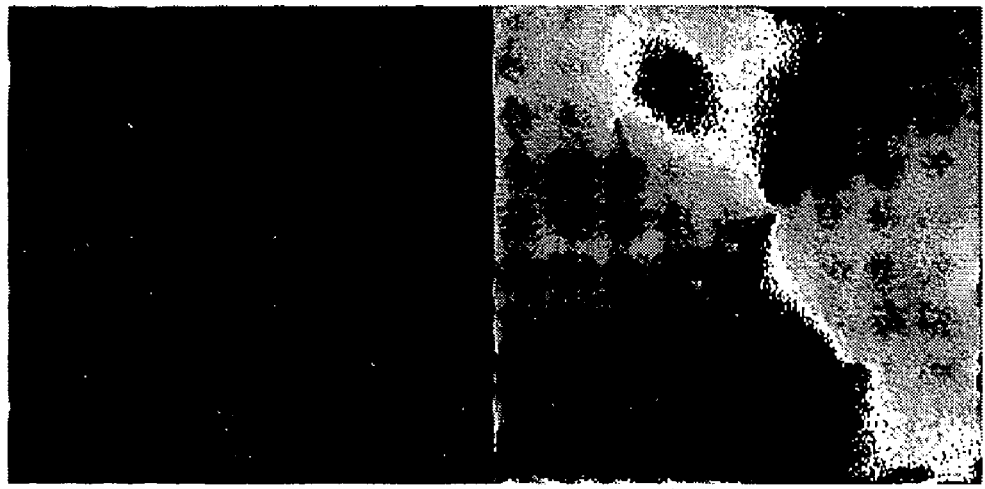
FIGS. 13D and 13E are the magnitude and phase components respectively of applying the modified energy operator to the image of FIG. 13A.

To further illustrate the advantages of the modified energy operator $\Psi_M$, the complex energy operator $\Psi_c$ and the modified energy operator $\Psi_M$ are respectively applied to an image with uniform noise in the range ±64 greylevels shown in FIG. 13A. The magnitude and phase components respectively of the complex energy operator $\Psi_c$ are shown in FIGS. 13B and 13C, while the magnitude and phase components respectively of the modified energy operator $\Psi_M$ are shown in FIGS. 13D and 13E. Because of the high level of noise in the input image, the phase component of the complex energy operator $\Psi_c$ is completely weighed down by the contribution of the noise. The modified energy operator $\Psi_M$ gives a much clearer phase without any obvious blurring that would be expected of noise reduction by conventional low pass filtering of the complex energy operator $\Psi_c$.

Figure 14A:
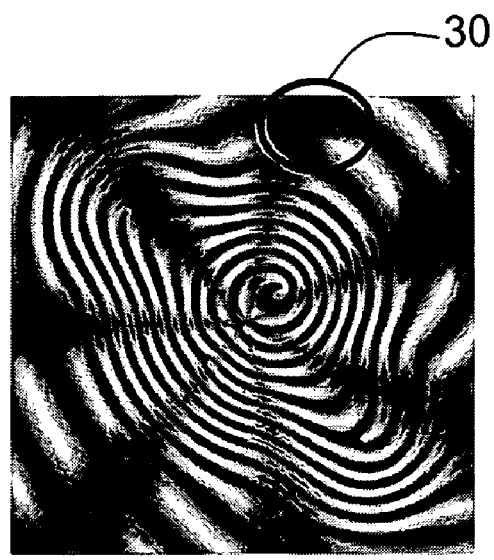
FIG. 14A is an example of a fringe pattern image with amplitude and frequency modulation.
Figures 14B, 14C:
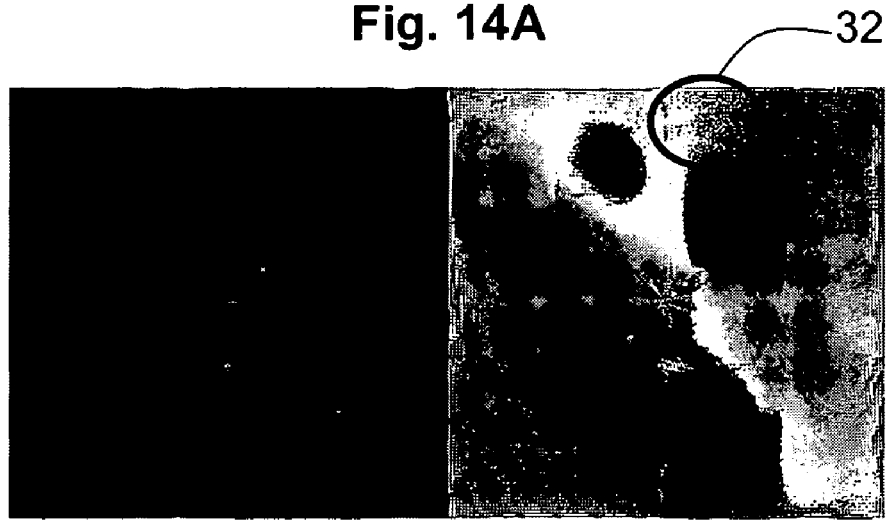
FIGS. 14B and 14C are the magnitude and phase components respectively of applying the energy operator to the image of FIG. 14A.
Figures 14D, 14E:
FIGS. 14D and 14E are the magnitude and phase components respectively of applying the modified energy operator to the image of FIG. 14A.

Another comparative example wherein the performance of the modified energy operator $\Psi_M$ can be seen is shown in FIGS. 14A to 14E. FIG. 14A shows an amplitude and frequency modulated image. The magnitude and phase components respectively of the complex energy operator $\Psi_c$ are shown in FIGS. 14B and 14C, while the magnitude and phase components respectively of the modified energy operator $\Psi_M$ are shown in FIGS. 14D and 14E. The complex energy operator $\Psi_c$ again has difficulty in regions of low spatial frequency $\lambda_0$, such as area 30, causing the corresponding area 32 in FIG. 14C to have high levels of uncertainty. On the other hand, the corresponding area 34 when the modified energy operator $\Psi_M$ is applied, provides a much clearer result.

It is further noted that since the underlying fringe pattern of the images in FIGS. 12A, 13A and 14A are the same with different processes applied thereto, the processes not affecting the orientation of the fringes of the underlying pattern, the results of the modified energy operator $\Psi_M$ shown in FIGS. 12E, 13E and 14E are substantially similar.

The modified energy operator $\Psi_M$ may be implemented entirely in the Fourier space domain by using complex convolution kernels that correspond to the pure phase spirals. With the kernel k and its Fourier transform K, the Fourier transform pair can be defined as:

$$K(u, v) = \exp(i\varphi) = \frac{u + iv}{q} \Leftrightarrow \frac{i(x + iy)}{2\pi r^3} = \frac{i\exp(i\theta)}{2\pi r^2} = k(x, y) \quad (35)$$

wherein the spatial polar coordinates satisfy the following:

$$\left.\begin{array}{l} x^2 + y^2 = r^2 \\ x = r\cos(\theta) \\ y = r\sin(\theta) \end{array}\right\} \quad (36)$$

The convolution kernel k reduces by the inverse square of the radius, and also has a spiral phase structure, but rotated by 90° with respect of the x-y coordinates. According to the above, since it is now known those operations required to be performed to extract local orientation information from a fringe pattern, it is not necessary to perform such calculations in the Fourier domain. Rather, the desired functions may be recalculated in the real domain thereby facilitating ease of processing. In many cases the desired functions may be approximated by suitably truncated kernels. The inverse square drop-off allowing relatively small truncation errors even for small kernels Referring again to FIG. 1, by considering a sufficiently small region $\Omega$ of images composed of line or edge features, the local structure fits the model of Equation (1). This is true for many image features, the most obvious exceptions being textures that contain multiple AM-FM modulated signals. Sometimes an image may approximate the model of Equation (17) except for a low or zero frequency background offset in intensity. In such cases this background level may be removed by high pass filtering (or related methods) leaving an image that does satisfy Equation (17) which can then be processed using the complex energy operator formalism.

Where Equation (17) is representative, the modified energy operator $\Psi_M$, as defined in Equation (34), may be used for the calculation of the orientation angle $\beta_0$ of all such images.

An example of such an image and the operation of the modified energy operator $\lambda_M$ are shown in FIGS. 15A to 15E. FIG. 15A shows a texture image. The texture image is characterised by distinct lines 40 and areas of low variation 41. The magnitude and phase components respectively of the complex energy operator $\Psi_c$ are shown in FIGS. 15B and 15C, while the magnitude and phase components respectively of the modified energy operator $\Psi_M$ are shown in FIGS. 15D and 15E. The phase component of the modified energy operator $\Psi_M$ provides a result that is more intuitively representative of the orientation of the texture image of FIG. 15A.

Figure 16:
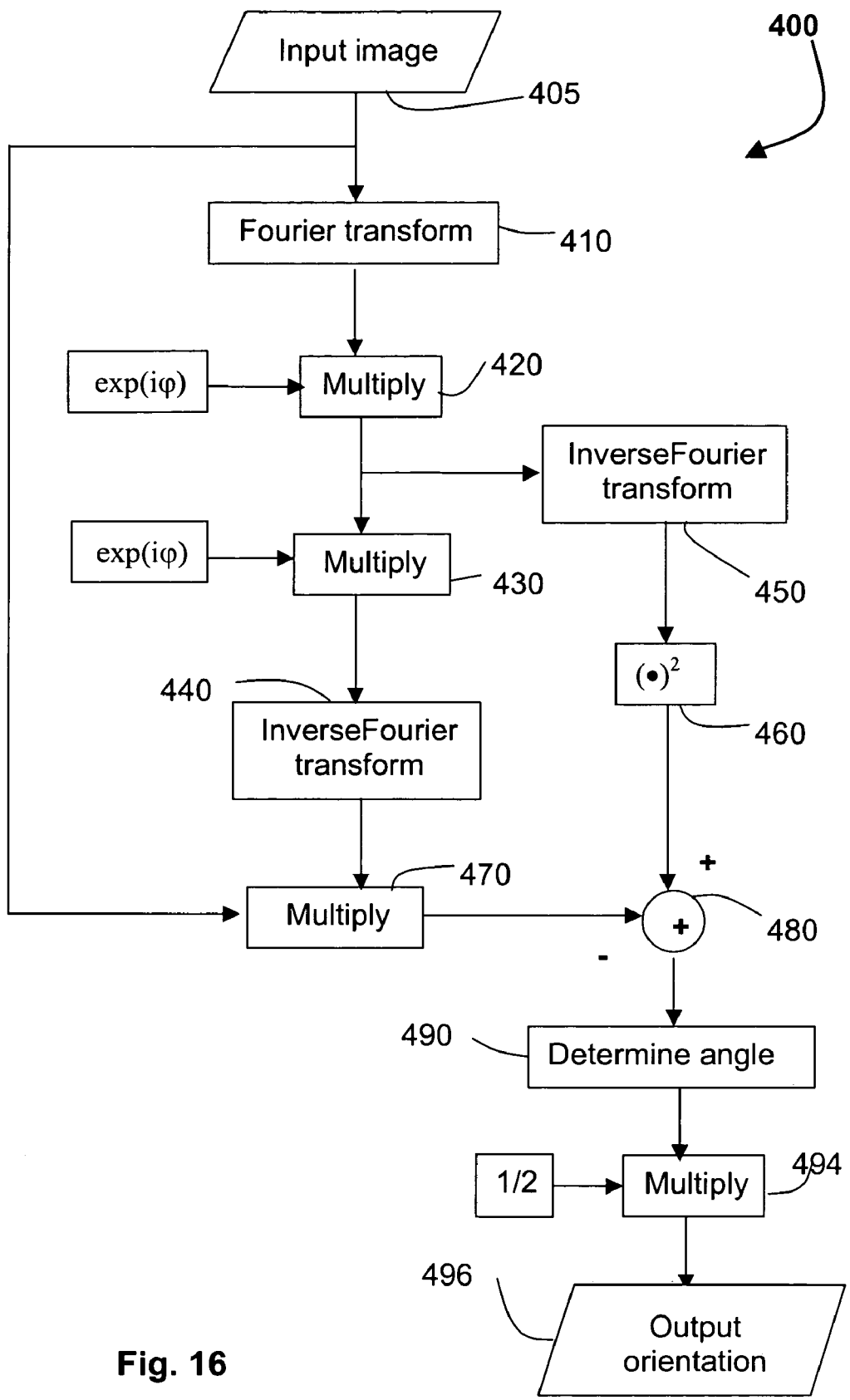
FIG. 16 is a flow diagram of a method of estimating the pattern and texture orientation of images.

A flow diagram of a method 400 of estimating the pattern and texture orientation of images is shown in FIG. 16. An input image is inserted in step 405. The input image is typically digital format with a predetermined number of columns and rows. Alternatively the image may be scanned to convert it into the digital format.

Although the preceding analysis has been in terms of continuous functions and continuous operations, the analysis is also directly applicable to discretely sampled functions (images) and discrete operations.

A Fourier transform of the image is calculated in step 410, typically using the Fast Fourier Transform (FFT). The Fourier transformed image is multiplied with a term $\exp(i\phi)$ in step 420.

An output of step 420 is again multiplied with the term $\exp(i\phi)$ in step 430 before it is inverse Fourier transformed, typically using an Inverse Fast Fourier Transform (IFFT) in step 440. The result is then multiplied with the input signal in step 470.

The output from step 420 is also inverse Fourier transformed in step 450 before it is squared in step 460. The output from step 470 is subtracted from the output of step 460 in step 480. From this complex signal, the angle of the signal is calculated in step 490 before it is halved in step 494 to provide an orientation angle $\beta_0$ as an output in step 496.

As noted above, the orientation estimate is modulo $\pi$ but can be unwrapped using continuity constraints to obtain an estimate that is modulo $2\pi$.

Interferometry is the use of interference phenomena for measurement purposes. This allows for the measurement of very small angles or small displacements of objects relative to one another. An interferometer is a device to make such measurements, which typically uses a beam of light, coming from a single source, such as a star, a laser or a lamp, and two or more flat mirrors to split off different light beams. These beams are then combined so as to 'interfere' with each other. The beams interfere with each other by constructively adding together and cancelling each other out, thereby forming alternating bands of light and dark, called fringe patterns.

What makes the interferometer such a precise measuring instrument is that these fringes are only one light-wavelength apart, which for visible light corresponds to about 590 nm. With the fringe patterns having a cyclic nature with phases that shifted, the important measurement parameter is the relative phase-shifts between these phase-related fringe patterns.

Consider an intensity $f_n(x,y)$ of the $n^{th}$ fringe pattern in a sequence of phase-related fringe patterns with the following mathematical form:

$$f_n(x,y) = a(x,y) + b(x,y)\cos[\chi(x,y) + \delta_n] \quad (37)$$

wherein $a(x,y)$ is again denotes a background or offset, $b(x,y)$ the amplitude modulation, and $\chi(x,y)$ the phase. Each fringe pattern has a phase shift parameter $\delta_n$. An example of such a fringe pattern is shown in FIG. 20.

An improved method of estimating relative phase-shifts between phase-related fringe patterns $f_n$ is proposed. The method is based on an isotropic quadrature transform. The isotropic quadrature transform is used to estimate the spatial phase $[\chi(x,y) + \delta_n]$ in one fringe pattern $f_n$, followed by comparing the spatial phase $[\chi(x,y) + \delta_n]$ between fringe patterns $f_n$ to estimate the relative phase-shift(s). With 3 or more frames, the method is independent of background variations $a(x,y)$.

The exact value of phase $\chi(x,y)$ can be calculated from three or more fringe patterns $f_n$ if the values of the phase shift parameter $\delta_n$ is known for each fringe pattern $f_n$. For more than three fringe patterns $f_n(x,y)$, the phase $\chi(x,y)$ is overdetermined and is usually estimated in a maximum likelihood process. Other estimation processes may be more appropriate in cases where additional systematic error or distortion effects apply to Equation (37).

Consider a least squares estimate for the phase $\chi(x,y)$ from N fringe patterns:

$$\begin{pmatrix} \sum 1 & \sum c_n & \sum s_n \\ \sum c_n & \sum c_n^2 & \sum s_n c_n \\ \sum s_n & \sum s_n c_n & \sum s_n^2 \end{pmatrix} \begin{pmatrix} a \\ +b\cos\chi \\ -b\cos\chi \end{pmatrix} = \begin{pmatrix} \sum f_n \\ \sum c_n f_n \\ \sum s_n f_n \end{pmatrix} \quad (38)$$

where $c_n = \cos\delta_n$, and $s_n = \sin\delta_n$, and the summations are over N fringe patterns ie.

$$\sum = \sum_{n=1}^{N}.$$

Least squares Equation (38) can be inverted, providing $c_n$ and $s_n$ are such that a singular matrix does not occur, as follows:

$$\begin{pmatrix} a \\ +b\cos\chi \\ -b\cos\chi \end{pmatrix} \begin{pmatrix} \sum 1 & \sum c_n & \sum s_n \\ \sum c_n & \sum c_n^2 & \sum s_n c_n \\ \sum s_n & \sum s_n c_n & \sum s_n^2 \end{pmatrix}^{-1} = \begin{pmatrix} \sum f_n \\ \sum c_n f_n \\ \sum s_n f_n \end{pmatrix} \quad (39)$$

Equation (39) allows for the offset $a(x,y)$, the amplitude modulation $b(x,y)$, and the phase $\chi(x,y)$ to be calculated. However, before Equation (39) can be used, all the phase shift parameters $\delta_n$ must be known.

The phase shift parameter $\delta_n$ of each fringe pattern is estimated by using a 2-D quadrature technique based on a spiral phase Fourier operator. Estimation of phase $\chi(x,y)$ in the above manner has many advantages related to the extraordinary demodulation properties of the spiral phase Fourier operator.

A first step in determining the phase shift parameters $\delta_n$ is to remove the background (offset) $a(x,y)$ from each of the fringe patterns $f_n(x,y)$. In the preferred implementation, this is done by forming inter-frame differences between pairs of fringe patterns $f_n(x,y)$ as follows:

$$g_{nm} = f_n - f_m = -g_{mn} = b\{\cos[\chi + \delta_n] - \cos[\chi + \delta_m]\} \quad (40)$$

The inter-frame difference function $g_{nm}$ is a pure AMFM (amplitude modulation and frequency modulation) function without offset and therefore can be demodulated if the inter-frame difference function $g_{nm}$, which is also a fringe pattern, is locally simple. For the fringe pattern $g_{nm}$ to be locally simple, it has to have a unique orientation $\beta(x,y)$ and spacing $\lambda(x,y)$ at each location $(x,y)$, except, perhaps, at a finite number of locations where the orientation $\beta(x,y)$ and/or spacing $\lambda(x,y)$ may be uncertain. Advantageously, local simplicity is a property which distinguishes fringe patterns from other, more general, patterns. FIG. 1 shows the local structure of a typical fringe pattern for the small region $\Omega$.

A spiral phase Fourier operator $V\{\}$, hereinafter referred to as a vortex operator, is defined as follows:

$$V\{f(x,y)\} = F^{-1}\{\exp[i\phi]F\{f(x,y)\}\} \quad (41)$$

$$F\{f(x,y)\} = F(u,v)$$
$$= \int_{-\infty}^{\infty}\int_{-\infty}^{\infty} f(x,y)\exp[-2\pi i(ux+vy)]dxdy$$

-continued
$$F^{-1}\{F(u,v)\} = f(x,y)$$
$$= \int_{-\infty}^{\infty}\int_{-\infty}^{\infty} F(u,v)\exp[+2\pi i(ux+vy)]dudv$$

$$u = q\cos\phi$$
$$v = q\sin\phi$$

The Fourier operator $F\{\}$ transforms a general function $f(x,y)$ from the spatial domain $(x,y)$ to the spatial frequency domain $(u,v)$. The Inverse Fourier operator $F^{-1}\{\}$ transforms a spatial frequency domain signal back to the spatial domain $(x,y)$. In practice, for discretely sampled images, the Fourier and the Inverse Fourier transforms are efficiently performed by a Fast Fourier transform algorithm and an Inverse Fast Fourier transform algorithm.

Figure 17:
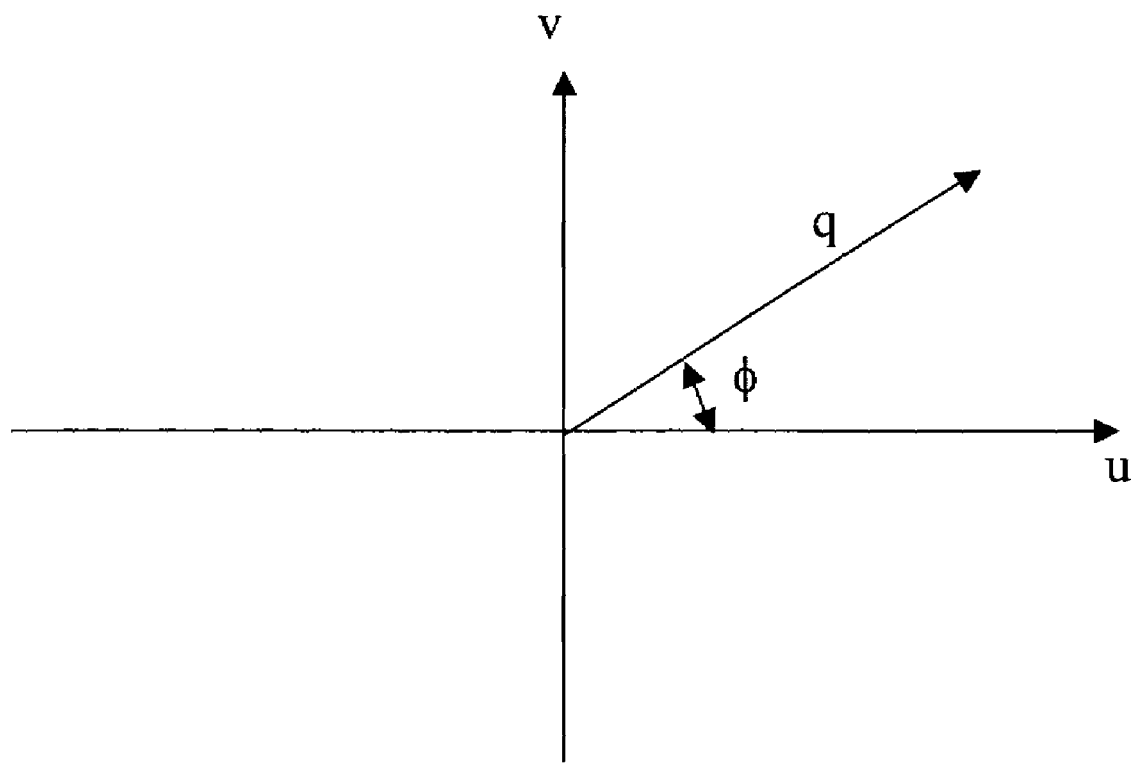
FIG. 17 shows the Fourier domain coordinates.

The spiral phase $\exp[i\phi]$ is wholly a function of the angular component of the spatial frequency polar coordinates $(q,\phi)$ shown in FIG. 17. The vortex operator $V\{\}$ is applied to the inter-frame difference functions $g_{nm}$ to obtain:

$$V\{g_{nm}\} \cong i\exp[i\beta]/b[\sin(\chi+\delta_n)-\sin(\chi+\delta_m)] \quad (42)$$

From Equation (42) it can be seen that the vortex operator $V\{\}$ is an isotropic quadrature operator in that it converts cosine fringes at any orientation $\beta(x,y)$ into sine fringes at the same orientation $\beta(x,y)$. The approximation in Equation (42) is valid except in regions where the amplitude modulation $b(x,y)$, spacing $\lambda(x,y)$ or orientation $\beta(x,y)$ vary too rapidly. Areas where the radius of curvature of the fringe pattern $g_{nm}$ is smaller than the fringe spacing $\lambda(x,y)$ also give a lower accuracy approximation. However, for most typical fringe patterns $g_{nm}$, the approximation is good and any errors are isotropically distributed. In contrast, conventional methods, such as the half-plane Hilbert transform, cause highly directional errors, and are not suitable for high precision demodulation of general fringe patterns.

Next, the local orientation $\beta(x,y)$ is compensating for. To do so, the orientation $\beta(x,y)$ must be estimated. There are a number of ways to do this. One method relies on the gradient of the fringe pattern $g_{nm}$. The ratio of the x and y components gives the tangent angle $\beta(x,y)$ from the local Taylor's series expansion of the phase $\chi(x,y)$ about the point $(x_0,y_0)$:

$$\chi(x,y) = \chi_{00} + 2\pi u_0(x-x_0) + 2\pi v_0(y-y_0) + O(r^2) \quad (43)$$

$$\frac{\partial \chi(x,y)}{\partial x}\bigg|_{\substack{x=x_0\\y=y_0}} \cong 2\pi u_0$$

$$\frac{\partial \chi(x,y)}{\partial y}\bigg|_{\substack{x=x_0\\y=y_0}} \cong 2\pi v_0$$

The gradient components are:

$$\frac{\partial g_{nm}}{\partial x} \cong b(-\sin(\chi+\delta_n)+\sin(\chi+\delta_m))\frac{\partial \chi}{\partial x} \quad (44)$$

$$\frac{\partial g_{nm}}{\partial y} \cong b(-\sin(\chi+\delta_n)+\sin(\chi+\delta_m))\frac{\partial \chi}{\partial y}$$

The ratio of the gradient components gives the tangent angle:

$$\frac{\partial g_{nm}}{\partial y} \bigg/ \frac{\partial g_{nm}}{\partial x} \cong \frac{v_0}{u_0} = \tan\beta_{nm} \quad (45)$$

Again the approximation of Equation (45) is valid in regions with smoothly varying parameters as defined for the vortex operator V{ }. Other methods of orientation estimation may be used. For example, methods based on the multi-dimensional energy operator or the vortex operator itself may be used. Generic orientation estimation is assumed at this point, and the orientation β for any fringe pattern $f_n$ or inter-frame difference function $g_{nm}$ may be calculated. Alternatively the orientation β may be estimated from combinations of the previous methods in a statistically advantage manner. It will be assumed hereinafter that there is just one orientation estimate, which shall be called orientation estimate $\beta_e$. The orientation estimate $\beta_e$ typically contains an ambiguity in the sign:

$$\exp[i\beta] = \cos\beta + i\sin\beta = \pm\frac{u_0 + iv_0}{\sqrt{u_0^2 + v_0^2}} \quad (46)$$

Different orientation estimates $\beta_e$ typically have the sign ambiguities in different places. It is worth noting that the overall sign ambiguity arises from the general difficulty in distinguishing a fringe at orientation β from a fringe at orientation β+π.

Equation (40) is rewritten as:

$$g_{nm}=2b\sin[\chi+(\delta_m+\delta_n)/2]\sin[(\delta_m-\delta_n)/2] \quad (47)$$

and Equation (42) as:

$$\exp[-i\beta_e]V\{g_{nm}\}=-2ib\exp[i(\beta-\beta_e)]\cos[\chi+(\delta_m+\delta_n)/2]\sin[(\delta_m-\delta_n)/2] \quad (48)$$

The complex exponential in Equation (48) has possible values {-1;1}, depending on the orientation estimate $\beta_e$, and shall be called a polarity factor h(x,y):

$$h(x,y)=\exp[i(\beta-\beta_e)] \quad (49)$$

A contingent analytic image $\breve{g}_{nm}$ is defined as:

$$\breve{g}_{nm}=i(g_{nm}-\exp[-i\beta_e]V\{g_{nm}\}) \quad (50)$$

By substituting Equations (47), (48) and (49) into Equation (50), the contingent analytic image $\breve{g}_{nm}$ is rewritten as:

$$\breve{g}_{nm}\cong 2b\sin[(\delta_m-\delta_n)/2](h\cos[\chi+(\delta_m+\delta_n)/2]+i\sin[\chi+(\delta_m+\delta_n)/2]) \quad (51)$$

This definition of an analytic image is contingent upon the orientation function $\beta_e$ used in the definition shown in Equation (50). It is noted that the contingent analytic image $\breve{g}_{nm}$ can be achieved by placing the inter-frame difference function $g_{nm}$ in the imaginary part of a complex image, and placing the imaginary output of the vortex operator V{ } in the real part.

A phase $\alpha_{nm}$ of the contingent analytic image $\breve{g}_{nm}$ is calculated as follows:

$$\alpha_{nm}=Arg\{ig_{nm}-i\exp[-i\beta_e]V\{g_{nm}\}\}=h[\chi+(\delta m+\delta n)/2] \quad (52)$$

The calculation of phase $\alpha_{nm}$ is possible as long as $\sin[(\delta_m-\delta_n)/2]\neq 0$, which only occurs if $\delta_m-\delta_n\neq 2\pi j$ where j is an integer. Clearly the failure to calculate phase $\alpha_{nm}$ in such a case is due to the phase shifts $\delta_m$ and $\delta_m$ being essentially equal and the inter-frame difference function $g_{nm}$ being identically zero.

The phase difference between dependent pairs of contingent analytic images, such as $\breve{g}_{nm}$ and $\breve{g}_{mk}$, is calculated as follows:

$$\alpha_{nm}-\alpha_{mk}=h[\chi+(\delta_m+\delta_n)/2]-h[\chi+(\delta_k+\delta_m)/2]=h[(\delta_n-\delta_k)/2] \quad (53)$$

This allows a difference in phase between any two fringe patterns $f_n$ and $f_k$ to be found, namely $(\delta_n-\delta_k)$, with a sign ambiguity as a result of the polarity factor h. It is noted that all phase calculations, including phase differences, are calculated modulo 2π. Various methods may be used to extract both the polarity factor h and the phase differences $(\delta_n-\delta_k)$. In a simplest implementation, from Equation (53), the absolute values of the phase difference between two fringe patterns $f_n$ and $f_k$ are averaged over the full fringe pattern area S:

$$|\delta_n - \delta_k|_{mean} = 2\frac{\int\int_S |\alpha_{nm} - \alpha_{mk}|\,dx\,dy}{\int\int_S dx\,dy} \quad (54)$$

A preferred implementation uses a weighted integral with weighting w(x,y) over the fringe pattern area S. The weighting w(x,y) used should be a measure of the estimated accuracy of the local estimate of the phase $\alpha_{nm}$. This is related to the AMFM characteristics of the fringe patterns $f_n(x,y)$ in the sequence of phase-related fringe patterns. Thus, the absolute values of the phase difference $(\delta_n-\delta_k)$ between two fringe patterns $f_n$ and $f_k$, weighted averaged over the full fringe pattern area S is:

$$|\delta_n - \delta_k|_{mean}^{weighted} = 2\frac{\int\int_S |\alpha_{nm} - \alpha_{mk}|w^2(x,y)\,dx\,dy}{\int\int_S w^2(x,y)\,dx\,dy} \quad (55)$$

This allows for a very low (or zero) weighting w(x,y) to be used where the phase $\alpha_{nm}$ varies quickly, as is the case for discontinuities, or areas where the modulation b(x,y) is low. Equation (53) can be rewritten as:

$$\frac{\alpha_{nm} - \alpha_{mk}}{|\alpha_{nm} - \alpha_{mk}|} = h(x,y)\frac{\delta_n - \delta_k}{|\delta_n - \delta_k|} \quad (56)$$

By arbitrarily taking the phase difference $(\delta_n-\delta_k)$ for these particular values of n and k as positive, from Equation (56) follows an estimated polarity factor $h_e$ as:

$$h_e(x,y) = \frac{\alpha_{nm} - \alpha_{mk}}{|\alpha_{nm} - \alpha_{mk}|} \quad (57)$$

This estimated polarity factor function $h_e$ can be used in all further computations, because a global sign convention has effectively been set for the phase difference $(\delta_n-\delta_k)$ in the fringe pattern sequence.

Next, the phase difference $\delta_n-\delta_k$ may be calculated for all possible pairs. The minimum requirement is to calculate the phase difference $\delta_n-\delta_k$ for all sequential pairs, which amounts to N values for N fringe patterns $f_n$. By also calculating the phase difference $\delta_n-\delta_k$ for non-sequential pairs, additional statistical robustness in the estimates is achieved. The number of combinations of two-phase differences $\delta_n-\delta_k$ from N phases are:

$$\frac{N!}{2(N-2)!} \tag{58}$$

Figure 18A:
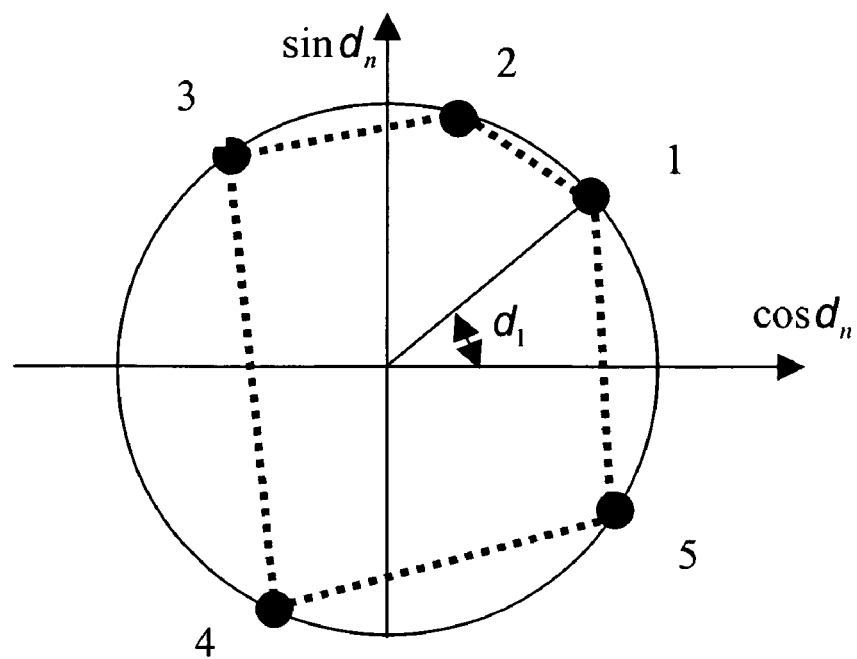
FIGS. 18A and 18B show the phase shift parameters $d_n$ for the case where N=5 on a polar plane.
Figure 18B:
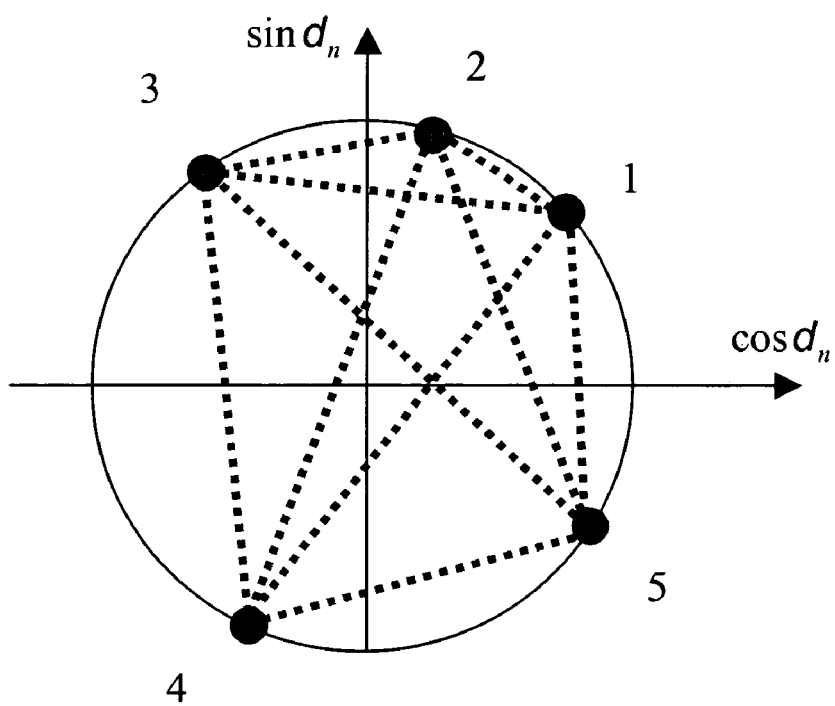

In the particularly interesting case where N=3, the number of combination is also 3, which equals the number of sequential differences too. FIGS. 18A and 18B show the phase shift parameters $\delta_n$ for the case where N=5 on a polar plane. The points 1-5 are thus on a unity circle at points corresponding to $\exp(i\delta_n)$. The connecting line between points n and m corresponds to $[\exp(i\delta_m)-\exp(i\delta_n)]$. The length of each connecting line is proportional to $\sin[(\delta_n-\delta_k)/2]$, which also appeared in the inter-frame difference function $g_{nm}$ of Equation (47). The length of each connecting line is a direct indication of the reliability of the estimate of the phase difference $\delta_n-\delta_k$, as the length is the factor appearing in the magnitude of the inter-frame difference function $g_{nm}$. FIG. 18A shows the connecting lines for all sequential pairs, whereas FIG. 18B shows all possible connecting lines, and thus inter-frame differences $\delta_n-\delta_k$, which adds another 5 phase differences $\delta_n-\delta_k$. With the phase differences $\gamma_{mn}$ defined as $\gamma_{mn}=\delta_m-\delta_n$, an estimation $\bar{\gamma}_{mn}$ of each of the phase differences $\gamma_{mn}$ may be calculated using a weighted mean, and compensated by the estimated polarity $h_e$ as follows:

$$\bar{\gamma}_{nk} = \left\{ 2\frac{\iint_S h_e(\alpha_{nm}-\alpha_{mk})w^2(x,y)\,dxdy}{\iint_S w^2(x,y)\,dxdy} \right\}_{mod\,2\pi} \tag{59}$$

In situations where the fringe patterns $f_n$ contain noise and/or other distortions, the best phase differences estimates $\bar{\gamma}_{mn}$ may come from a two dimensional fit of all the points corresponding to $\exp(i\delta_n)$, as shown in FIGS. 18A and 18B, to a unit radius circle.

Without loss of generality, one of the phase shift parameters $\delta_n$ may be set to zero. For convenience the first phase shift parameter $\delta_1=0$ is set. This is consistent with the idea that the absolute value of the phase $\chi(x,y)$ is undefined and only phase differences $\gamma_{mn}=\delta_m-\delta_n$ are really meaningful. The remaining (relative) phase shift parameters $\bar{\delta}_n$ in are calculated as follows:

$\delta_1=0$ $\delta_2=\delta_1+\bar{\gamma}_{21}$ $\delta_3=\delta_2+\bar{\gamma}_{32}$ $\delta_4=\delta_3+\bar{\gamma}_{43}$ $\delta_5=\delta_4+\bar{\gamma}_{54}$ (60)

These values of the phase shift parameters $\delta_n$ are substituted back into the general PSA defined by Equation (39). This allows for all the fringe pattern parameters, namely the offset a(x,y), the amplitude modulation b(x,y), and a phase $\chi'(x,y)$ to be calculated. It is noted that the calculated phase $\chi'(x,y)$ then includes a common phase shift, namely the phase shift $\delta_1$.

However, there may be some residual calibration error due to the original vortex operator failing in certain areas. These errors are rectified by re-evaluating the weight function w(x, y) based on the present estimates of the offset a(x,y), the amplitude modulation b(x,y), and phase $\chi'(x,y)$, as well as their partial derivatives. This allows for the assessment of how well the original fringe patterns, in the form of the inter-frame difference functions $g_{nm}$, fulfilled the smoothness requirements of the vortex operator V{ }. Areas where the phase $\alpha_{nm}$ varies too quickly, or areas where the modulation b(x,y) is too low, the weighting function w(x,y) is reduced or set to zero. Once a new weight function w(x,y) is formed, the phase calibration process, from Equation (55) onwards, is repeated, resulting in better estimates for the phase shift parameters $\bar{\delta}_n$.

The accuracy of the estimates for the phase shift parameters $\bar{\delta}_n$ may be expressed as the variance of phase difference, as follows:

$$\sigma^2_{\bar{\delta}_n-\bar{\delta}_k} = 4\frac{\iint_S(|\alpha_{nm}-\alpha_{mk}|-\bar{\alpha}_{nk})^2 w^2(x,y)\,dxdy}{\iint_S w^2(x,y)\,dxdy} \tag{61}$$

wherein $$\bar{\alpha} = \frac{\iint_S |\alpha_{nm}-\alpha_{mk}| w^2(x,y)\,dxdy}{\iint_S w^2(x,y)\,dxdy} \tag{62}$$

Care is needed in evaluating Equations (61) and (62), as the phase $\chi'(x,y)$ is periodic and false discontinuities can disrupt the calculations if $\bar{\alpha}_{nk}$ near $-\pi$ or $\pi$.

Other methods for estimating these parameters $\bar{\alpha}_{nk}$ that specifically incorporate the cyclic nature may be used instead of Equation (62), for example:

$$\bar{\alpha}_{nk} = arg\{\iint \exp[i|\alpha_{nm}-\alpha_{mk}|]w^2(x,y)dxdy\} \tag{63}$$

Figure 19:
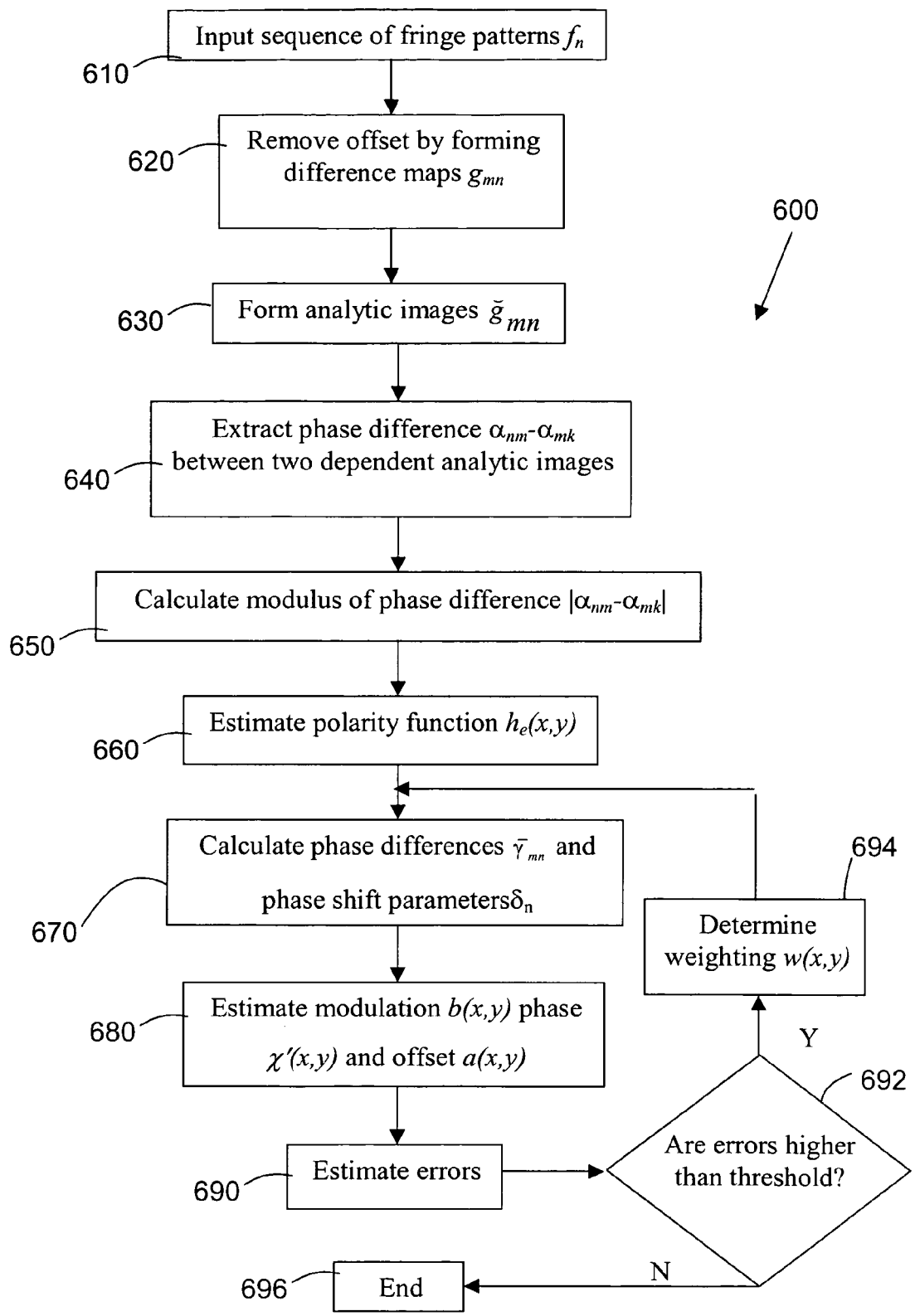
FIG. 19 shows a flowchart of an automatic calibration method.

FIG. 19 shows a preferred embodiment of a automatic phase-shift calibration method 600. A first step 610 receives a sequence of fringe patterns $f_n$. Each of the fringe patterns $f_n$ is real valued. An example of one of the fringe patterns $f_n$ from the sequence is shown in FIG. 20. Step 620 removes the fringe pattern offset a(x,y) from each of the fringe patterns $f_n$. This is done by forming inter-frame differences $g_{nm}$ as defined in Equation (40). The inter-frame differences $g_{nm}$ are also real valued.

Step 630 forms analytic images $\breve{g}_{nm}$ corresponding to the inter-frame differences $g_{nm}$ as defined in Equation (51). This is preferably achieved by placing the inter-frame difference function $g_{nm}$ in the imaginary part of a complex image, and placing the imaginary output of the vortex operator V{$g_{nm}$} in the real part. FIGS. 21A and 21B show the magnitude and phase components respectively of an analytic image $\breve{g}_{nm}$ of the example fringe pattern $f_n$ shown in FIG. 20. To enable the values of the phase components of the analytic image $\breve{g}_{nm}$ to be displayed, the values have been adapted to a range [0;255] with 0 representing $-\pi$ and 255 representing $$\frac{127}{128}\pi.$$

Figure 22A:
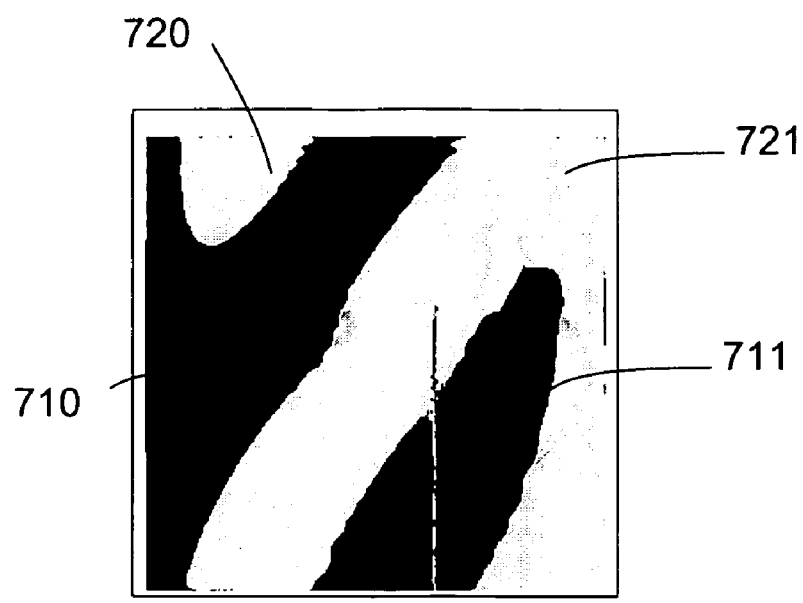
FIG. 22A shows a phase difference between dependent analytic images.
Figure 22B:
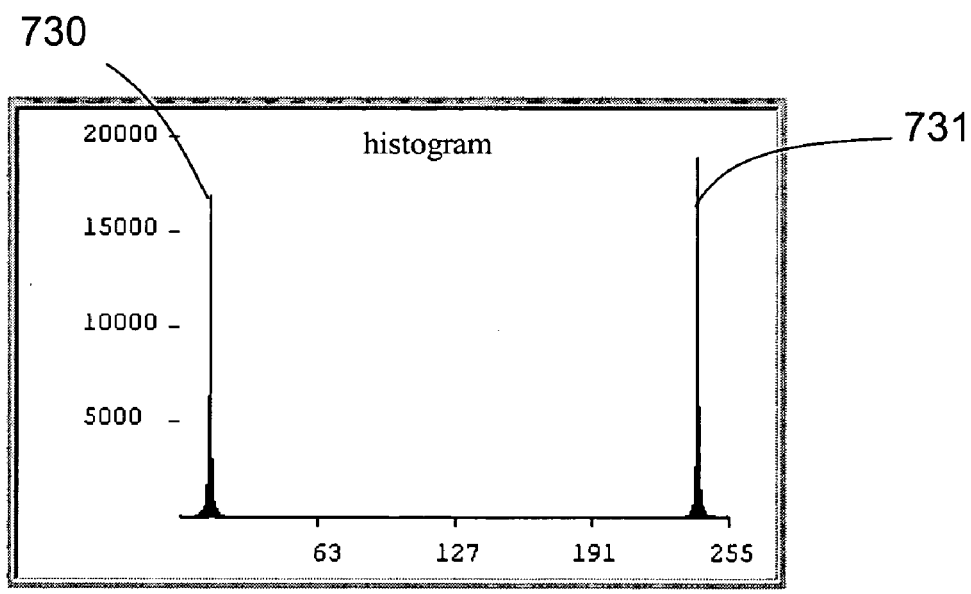
FIG. 22B shows a histogram of a spread in values of the phase difference shown in FIG. 22A.

Step 140 extracts the phase difference $\alpha_{nm}-\alpha_{mk}$ (modulo $2\pi$) from two dependent analytic images $\breve{g}_{nm}$ and $\breve{g}_{mk}$. FIG. 22A shows a phase difference $\alpha_{nm}-\alpha_{mk}$ between dependent analytic images $\breve{g}_{nm}$ and $\breve{g}_{mk}$ of the example fringe pattern $f_n$. Again, the values of the phase difference $\alpha_{nm}-\alpha_{mk}$ have been adapted to a range [0;255] with 0 representing $-\pi$ and 255 representing $$\frac{127}{128}\pi,$$

allowing the values to be displayed. The dark areas 710 and 711 have values close to zero on the representation, which corresponds to values for close to $-\pi$ in the phase difference $\alpha_{nm}-\alpha_{mk}$, whereas the light areas 720 and 721 have values close to 255 in the representation, which corresponds to values close to $\pi$ in the phase difference $\alpha_{nm}-\alpha_{mk}$. Accordingly, a value of 128 in the representation corresponds to a value of 0 in the phase difference $\alpha_{nm}-\alpha_{mk}$. The spread of values in the representation is shown in the histogram of FIG. 22B. The peaks 730 and 731 in the histogram corresponds to phase difference $\alpha_{nm}-\alpha_{mk}$ values.

Figure 23A:
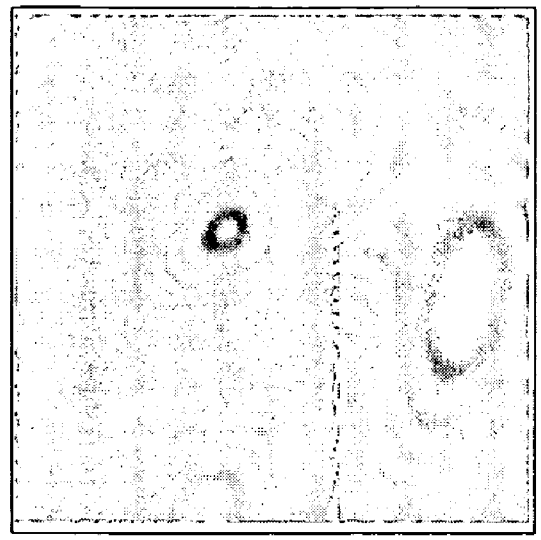
FIG. 23A shows a modulus of the phase difference between dependent analytic images shown in FIG. 22A.

Step 150 determines a modulus of the phase difference $|\alpha_{nm}-\alpha_{mk}|$. FIG. 23A shows the modulus $|\alpha_{nm}-\alpha_{mk}|$ of the phase difference $\alpha_{nm}-\alpha_{mk}$ represented in FIG. 22A. Again the values have been adapted to a range [0;255] with 0 representing $-\pi$ and 255 representing $$\frac{127}{128}\pi.$$

Figure 23B:
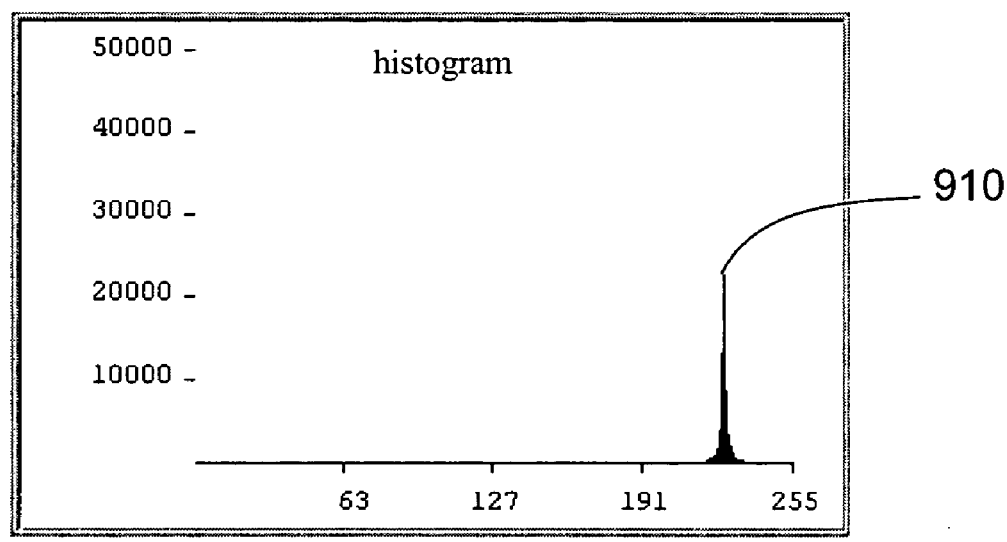
FIG. 23B shows a histogram of a spread in values of the modulus of the phase difference shown in FIG. 23B.

As can be seen from FIG. 23A, all the values have a small variation. This is confirmed in the histogram shown in FIG. 23B, wherein the spread of values in the representation is shown. A single peak 910 in the histogram corresponds to modulus of phase difference $|\alpha_{nm}-\alpha_{mk}|$ values. It is noted that the values have only a small spread around the peak value.

Step 660 calculates the estimated polarity factor $h_e(x,y)$, using Equation (37). The result is shown in FIG. 24 wherein all regions have values $-1$ or $1$, with the dark areas corresponding to values of $-1$ and the light areas corresponding to values of $1$. The phase differences $\bar{\gamma}_{mn}$ are calculated using Equation (59) and the relative phase-shift parameters $\bar{\delta}_n = \bar{\delta}_{n-1}+\bar{\gamma}_{n(n-1)}$ are estimated in a consistent manner in step 670.

Figure 26:
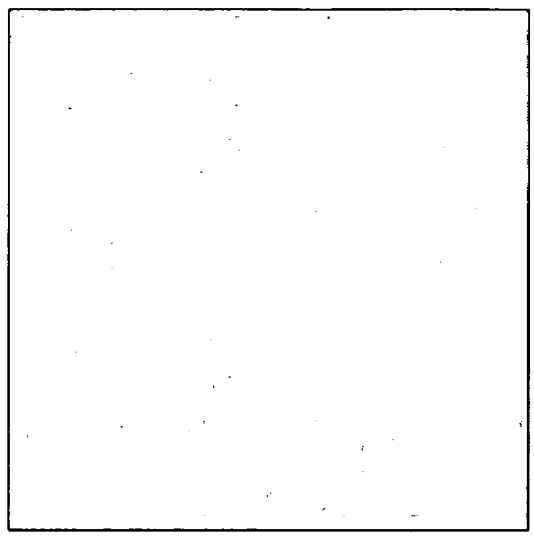
FIG. 26 shows an estimate of an offset of the fringe pattern shown in FIG. 20.

The relative phase-shift parameters $\bar{\delta}_n$ are then substituted into the general PSA defined by Equation (39) and the fringe pattern offset $a(x,y)$, the modulation $b(x,y)$, and phase $\chi'(x,y)$ are estimated in step 680. The resultant modulation $b(x,y)$, phase $\chi'(x,y)$ and offset $a(x,y)$ of the fringe pattern $f_n(x,y)$ of the example are shown in FIGS. 25A, 25B and 26 respectively. It is noted that FIGS. 25A and 26 appear almost uniformly white, which corresponds to almost no variation in the values of the modulation $b(x,y)$ and offset $a(x,y)$ with respect to coordinates $(x,y)$ for the example shown.

Step 690 estimates the likely errors in the earlier contingent analytic images $\check{g}_{nm}$ and $\check{g}_{mk}$ by means of a direct comparison of the analytic image $\check{g}_{nm}$ and the PSA image. Step 692 determines whether these errors are higher than a preset threshold. If the errors are smaller than the threshold, the method 600 ends in step 696. If these errors are higher than the threshold, the errors are incorporated into the weighting $w(x,y)$ in step 694 and the method 600 returns to step 670 in an iterative manner, where the new weighting $w(x,y)$ is applied to the estimation of the mean phase-difference $\bar{\gamma}_{mn}$, until the errors are sufficiently low. In a simplest embodiment, the weighting $w(x,y)$ is set to 1 for coordinates $(x,y)$ where the comparison is good and 0 where the comparison is poor.

Figure 27:
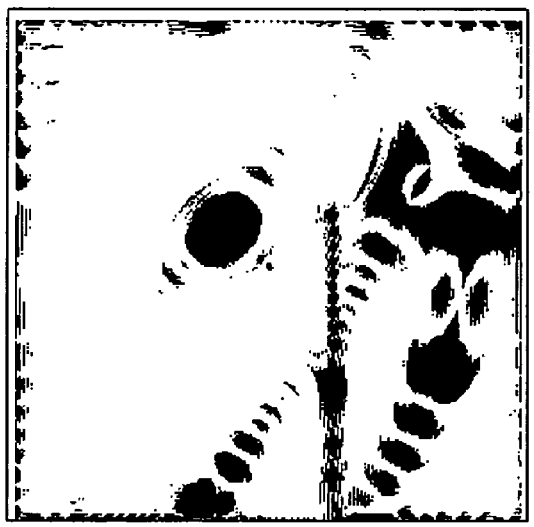
FIG. 27 shows a simple weight function calculated from the estimated errors in the analytic image shown in FIGS. 21A and 21B.

FIG. 27 shows an example where the comparison of step 690 yields a weighting $w(x,y)$ which is 1.0 where the comparison is good and 0.0 where the comparison is poor.

It is generally noted that in Equations with integrals over all values of x and y, such as Equations (41, 54, 55, 59 and 61), the integrals may be replaced by discrete summations for discretely sampled images.

The implementation is applicable to interferometric testing of optical components and optical systems. The embodiment may also be used in non-destructive testing to study the deformation of objects under stress, and the study of vibrating objects to identify vibration modes. Often, optical techniques are also used to visualise fluid flows, and variations in density are displayed in the form of fringe patterns.

Figure 28:
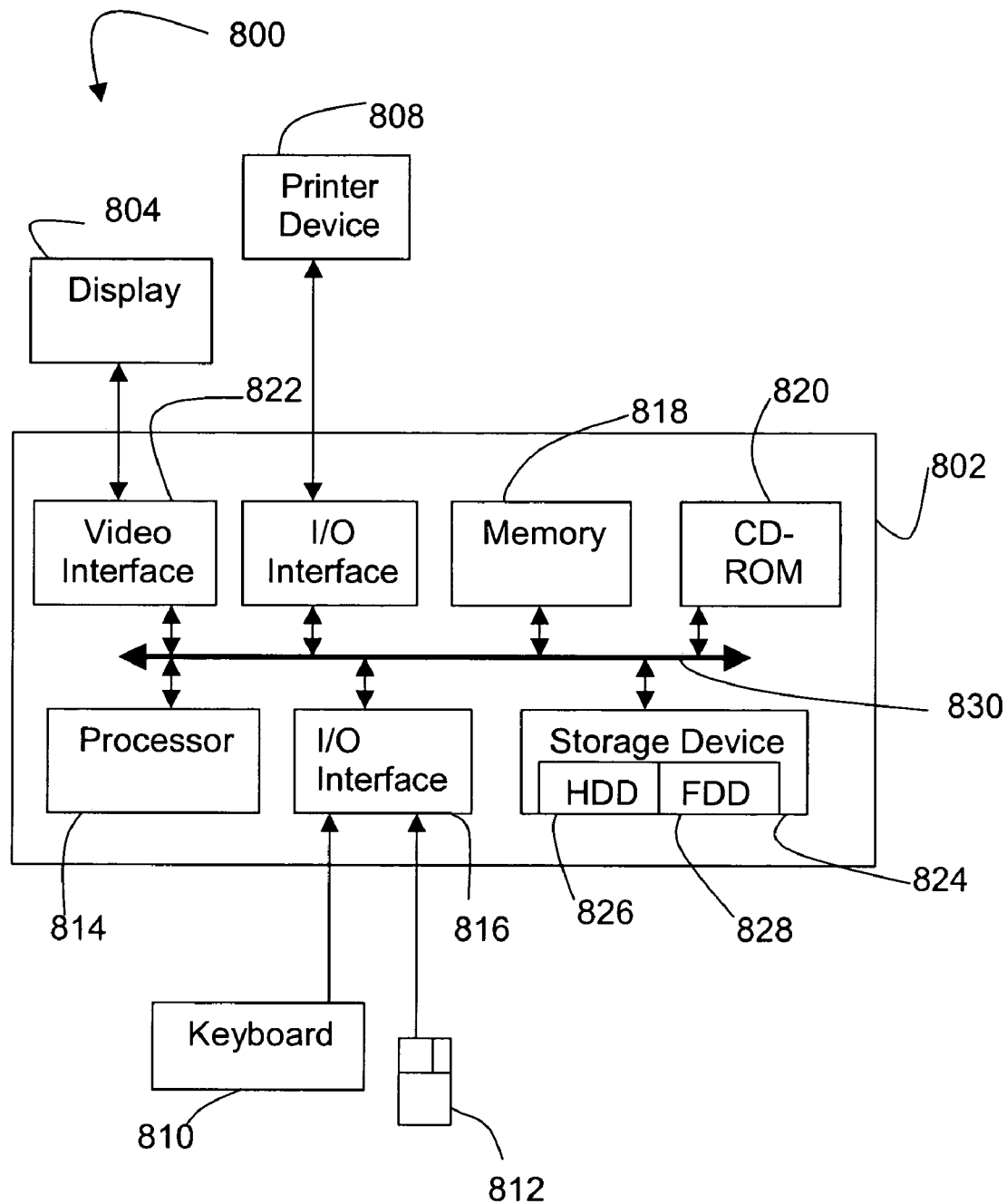
FIG. 28 shows a schematic block diagram of a general purpose computer upon which arrangements described can be practiced.

The methods of demodulating a two-dimensional pattern, of estimating an orientation angle of a pattern in an image, and of estimating relative phase shifts between fringe pattern images may be practiced using a conventional general-purpose computer system 100, such as that shown in FIG. 28 wherein the processes of FIGS. 3, 4, 16 and 19 may be implemented as software, such as an application program executing within the computer system 800. In particular, the steps of such methods are effected by instructions in the software that are carried out by the computer. The software may be stored in a computer readable medium, including the storage devices described below. The software is loaded into the computer from the computer readable medium, and then executed by the computer. A computer readable medium having such software or computer program recorded on it is a computer program product. The use of the computer program product in the computer preferably effects an advantageous apparatus for the methods described above.

The computer system 800 comprises a computer module 802, input devices such as a keyboard 810 and mouse 812, output devices including a printer 808 and a display device 804.

The computer module 802 typically includes at least one processor unit 814, a memory unit 818, for example formed from semiconductor random access memory (RAM) and read only memory (ROM), input/output (I/O) interfaces including a video interface 822, and an I/O interface 816 for the keyboard 810 and mouse 812. A storage device 824 is provided and typically includes a hard disk drive 826 and a floppy disk drive 828. A magnetic tape drive (not illustrated) may also be used. A CD-ROM drive 820 is typically provided as a non-volatile source of data. The components 814 to 828 of the computer module 802, typically communicate via an interconnected bus 830 and in a manner which results in a conventional mode of operation of the computer system 100 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 826 and read and controlled in its execution by the processor 814. Intermediate storage of the program may be accomplished using the semiconductor memory 818, possibly in concert with the hard disk drive 826. In some instances, the application program may be supplied to the user encoded on a CD-ROM or floppy disk and read via the corresponding drive 820 or 828, or alternatively may be read by the user from a network via a modem device (not illustrated). Still further, the software can also be loaded into the computer system 800 from other computer readable medium including magnetic tape, a ROM or integrated circuit, a magneto-optical disk, a radio or infrared transmission channel between the computer module 802 and another device, a computer readable card such as a PCM-CIA card, and the Internet and Intranets including email transmissions and information recorded on websites and the like. The foregoing is merely exemplary of relevant computer readable mediums. Other computer readable mediums may be practiced without departing from the scope and spirit of the invention.

The methods may alternatively be implemented in dedicated hardware such as one or more integrated circuits performing the functions or sub functions. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiment being illustrative and not restrictive.

We claim:

1. A method of demodulating a real two-dimensional pattern, the method comprising the steps of:
    estimating a quadrature two-dimensional pattern from said real two-dimensional pattern using a smooth phase only transform having an anti-symmetric phase; and
    creating a demodulated image by combining said real two-dimensional pattern and said estimated quadrature two-dimensional pattern.

2. A method as claimed in claim 1, wherein said smooth phase only transform having an anti-symmetric phase is a two-dimensional spiral phase filter.

3. A method as claimed in claim 2, wherein said estimating step includes the steps of:
    generating a frequency domain signal from said real two-dimensional pattern using a linear transform;
    applying said two-dimensional spiral phase filter to at least part of said frequency domain signal to provide a filter signal;
    generating a spatial domain pattern from said filtered signal using an inverse of said linear transform; and
    extracting from the spatial domain pattern an estimate of said quadrature two-dimensional pattern.

4. A method as claimed in claim 2, wherein said estimating step includes the steps of:
    convolving said real two-dimensional pattern with a complex function to provide a convolved spatial domain pattern, said complex function being an inverse Fourier transform of said two-dimensional spiral phase filter; and
    extracting from the spatial domain pattern an estimate of said imaginary two-dimensional pattern.

5. A method as claimed in claim 3, wherein the extracting step further includes determining an approximate orientation angle of at least one fringe pattern in said spatial domain pattern.

6. A method as claimed in claims 5 wherein determining said approximate orientation angle of at least one fringe pattern in said spatial domain pattern step comprises the steps of:
    applying a complex energy operator to the image to provide an energy encoded image;
    determining a phase component of said energy encoded image; and
    calculating said orientation angle from said phase component of said energy encoded image.

7. A method as claimed in claim 6 wherein said complex energy operator is defined as:

$$\Psi_c\{f\}=(D\{f\})^2-fD^2\{f\}$$

and said phase component of said energy encoded image is defined as:

$$2\beta_0=arg(\Psi_c\{f\}).$$

8. A method as claimed in claim 6 wherein said complex energy operator is a modified complex energy operator defined as:

$$\Psi_M\{f\}=(D_M\{f\})^2-fD_M^2\{f\}$$

and said phase component of said energy encoded image is defined as:

$$2\beta_0=arg(\Psi_M\{f\}).$$

9. A method as claimed in claim 6 wherein said image is pre-processed to remove background offsets.

10. Apparatus for demodulating a real two-dimensional pattern, the apparatus comprising:
    means for estimating a quadrature two-dimensional pattern from said real two-dimensional pattern using a smooth phase only transform having an anti-symmetric phase; and
    means for creating a demodulated image by combining said real two-dimensional pattern and said estimated quadrature two-dimensional pattern.

11. Apparatus as claimed in claim 10, wherein said smooth phase only transform having an anti-symmetric phase is a two-dimensional spiral phase filter.

12. Apparatus as claimed in claim 11, wherein said means for estimating an imaginary two-dimensional pattern includes:
    means for generating a frequency domain signal from said real two-dimensional pattern using a linear transform;
    means for applying said two-dimensional spiral phase filter to at least part of said frequency domain signal to provide a filter signal;
    means for generating a spatial domain pattern from said filtered signal using an inverse of said linear transform; and
    means for extracting from the spatial domain pattern an estimate of said quadrature two-dimensional pattern.

13. Apparatus as claimed in claim 11, wherein said means for estimating an imaginary two-dimensional pattern includes:
    means for convolving said real two-dimensional pattern with a complex function to provide a convolved spatial domain pattern, said complex function being an inverse Fourier transform of said two-dimensional spiral phase filter; and
    means for extracting from the spatial domain pattern an estimate of said imaginary two-dimensional pattern.

14. Apparatus as claimed in claim 12, wherein the extracting means further includes means for determining an approximate orientation angle of at least one fringe pattern in said spatial domain pattern.

15. Apparatus as claimed in claims 14 wherein said means for determining said approximate orientation angle of at least one fringe pattern in said spatial domain pattern comprises:
    means for applying a complex energy operator to the image to provide an energy encoded image;
    means for determining a phase component of said energy encoded image; and
    means for calculating said orientation angle from said phase component of said energy encoded image.

16. Apparatus for calculating a quadrature conjugate of a real two-dimensional code pattern, the apparatus comprising:
    a first spatial light modulator for modulating coherent light to produce said real two-dimensional pattern;

a first lens for Fourier transformation of said real two-dimensional pattern to produce a first Fourier transformed image;
a second spatial light modulator or spiral phase plate for phase modulating said first Fourier transformed image to produce a phase modulated image;
a second lens for Fourier transformation of said phase modulated image to produce a second Fourier transformed image;
a third spatial light modulator or spiral phase plate for phase modulating said second Fourier transformed image to produce said conjugate of said real two-dimensional pattern; and
an image sensor for capturing said conjugate of said real two-dimensional pattern.

17. A method of demodulating a real two-dimensional pattern, the method comprising the steps of:
estimating a quadrature two-dimensional pattern from said real two-dimensional pattern using a two-dimensional spiral phase filter; and
creating a demodulated image by combining said real two-dimensional pattern and said estimated quadrature two-dimensional pattern.

* * * * *